US009329379B2

(12) United States Patent
Jørgensen

(10) Patent No.: US 9,329,379 B2
(45) Date of Patent: May 3, 2016

(54) PROJECTING ILLUMINATION DEVICE WITH MULTIPLE LIGHT SOURCES

(75) Inventor: Dennis Thykjaer Jørgensen, Rønde (DK)

(73) Assignee: Martin Professional ApS, Aarhus N. (DK)

( * ) Notice: Subject to any disclaimer, the term of this patent is extended or adjusted under 35 U.S.C. 154(b) by 199 days.

(21) Appl. No.: 13/518,014

(22) PCT Filed: Dec. 20, 2010

(86) PCT No.: PCT/DK2010/050349
§ 371 (c)(1),
(2), (4) Date: Aug. 22, 2012

(87) PCT Pub. No.: WO2011/076213
PCT Pub. Date: Jun. 30, 2011

(65) Prior Publication Data
US 2012/0320102 A1   Dec. 20, 2012

(30) Foreign Application Priority Data
Dec. 21, 2009   (DK) .................................. 200901359

(51) Int. Cl.
G09G 5/10   (2006.01)
G02B 26/00  (2006.01)
(Continued)

(52) U.S. Cl.
CPC .............. *G02B 26/007* (2013.01); *F21S 10/007* (2013.01); *F21V 5/04* (2013.01); *F21V 7/0091* (2013.01);
(Continued)

(58) Field of Classification Search
CPC ........ F21S 10/007; F21V 19/001; F21V 5/04; F21V 7/0091; F21W 2131/406; F21Y 2101/02; G02B 19/0014; G02B 19/0028; G02B 19/0061; G02B 19/0066; G02B 26/007; G02B 27/0905; G02B 27/0955; G03B 21/20

USPC ....... 345/690; 362/84, 235; 348/68; 359/351; 353/38
See application file for complete search history.

(56) References Cited

U.S. PATENT DOCUMENTS

2002/0181231 A1   12/2002 Luk
2003/0035092 A1*  2/2003 Bramlett et al. ................ 355/69
(Continued)

FOREIGN PATENT DOCUMENTS

EP   2031296      3/2009
JP   200585669    10/2005
WO   WO00/36336   6/2000

OTHER PUBLICATIONS

European Search Report; European Application No. EP10838715; 8 pages.
International Search Report; International Application No. PCT/DK2010/050349; International Filing Date: Dec. 20, 2010; 3 pages.
English Abstract of Japanese Patent Publication No. JP2005285669; 1 page.

Primary Examiner — Jennifer Nguyen
Assistant Examiner — Tony Davis
(74) Attorney, Agent, or Firm — Blank Rome LLP

(57) ABSTRACT

The present invention relates to an illumination device illuminating an optical gate and projecting an image of the optical gate towards a target surface. The illumination device comprises a light source module generation light, an aperture delimiting the optical gate and a projecting system adapted to image the optical gate at a target surface. The light source module comprises a number of light sources and a number of light collecting means. The light collecting means comprise a central lens aligned along and a peripheral lens at least partially surrounding the central lens. The central lens collects and converts a first part of the light from the light source images the light source between the aperture the projecting system. The peripheral lens part collects and converts a second part of said light from said light source and is adapted to concentrate said second part of said light at said aperture.

20 Claims, 17 Drawing Sheets

(51) Int. Cl.
  *F21S 10/00*  (2006.01)
  *F21V 5/04*  (2006.01)
  *F21V 7/00*  (2006.01)
  *G02B 27/09*  (2006.01)
  *G03B 21/20*  (2006.01)
  *G02B 19/00*  (2006.01)
  *F21V 19/00*  (2006.01)
  *F21W 131/406*  (2006.01)
  *F21Y 101/02*  (2006.01)

(52) U.S. Cl.
  CPC ........ *G02B 19/0014* (2013.01); *G02B 19/0028* (2013.01); *G02B 19/0061* (2013.01); *G02B 19/0066* (2013.01); *G02B 27/0905* (2013.01); *G02B 27/0955* (2013.01); *G03B 21/20* (2013.01); *F21V 19/001* (2013.01); *F21W 2131/406* (2013.01); *F21Y 2101/02* (2013.01)

(56) References Cited

U.S. PATENT DOCUMENTS

| | | | |
|---|---|---|---|
| 2004/0207999 A1* | 10/2004 | Suehiro et al. | 362/84 |
| 2007/0091600 A1* | 4/2007 | Lerner | G02B 27/0905 362/244 |
| 2007/0176187 A1* | 8/2007 | Iwanaga | 257/79 |
| 2007/0297170 A1* | 12/2007 | Tatsuno | 362/227 |
| 2008/0225387 A1* | 9/2008 | Hainz | B82Y 10/00 359/351 |
| 2008/0304536 A1 | 12/2008 | Gold et al. | |
| 2009/0302739 A1* | 12/2009 | Levon | A41D 27/085 313/483 |
| 2010/0097802 A1* | 4/2010 | Jurik | 362/235 |
| 2010/0136709 A1* | 6/2010 | Ruckstuhl | G01N 21/645 436/164 |
| 2010/0283842 A1* | 11/2010 | Guissin | G02B 13/06 348/68 |
| 2011/0044056 A1* | 2/2011 | Travis | G02B 6/0053 362/311.02 |

* cited by examiner

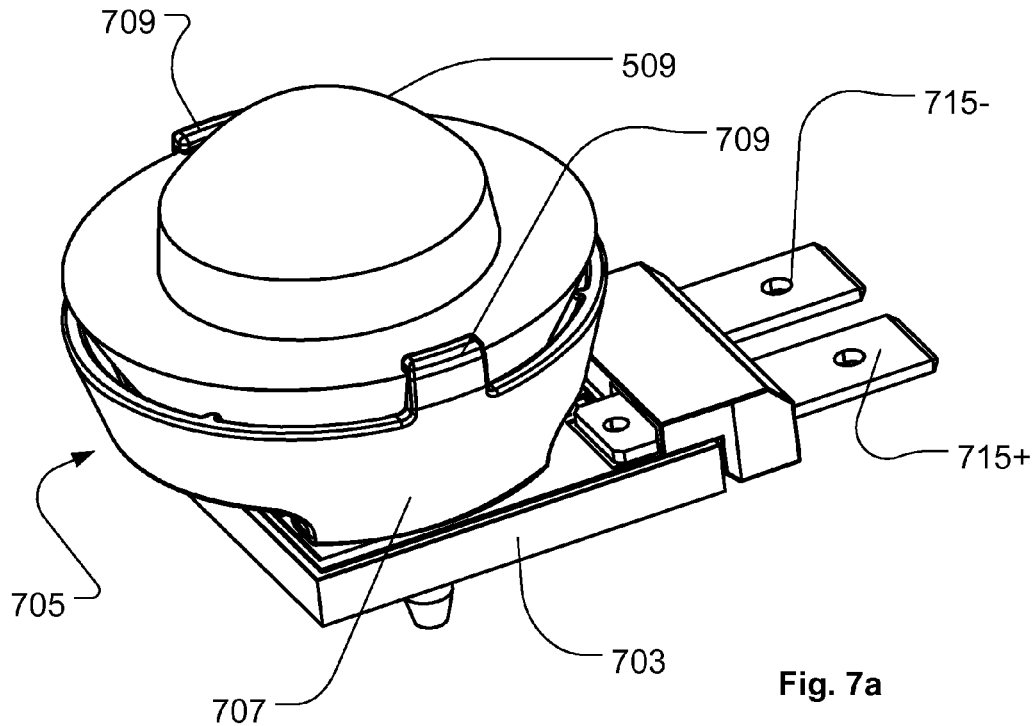
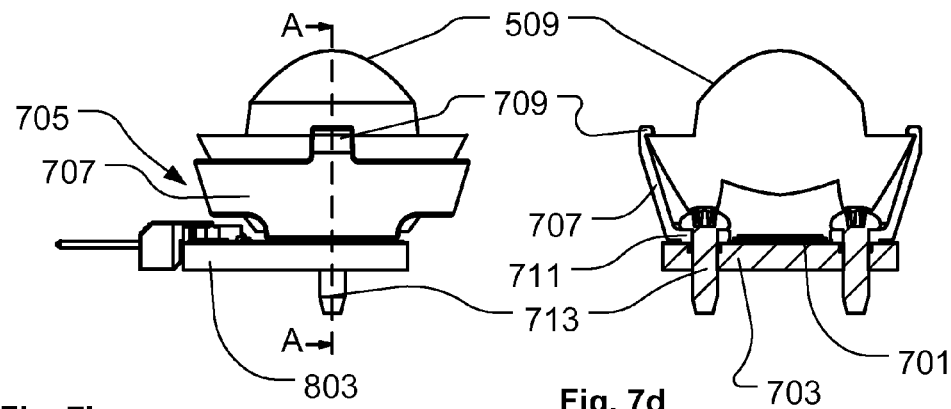
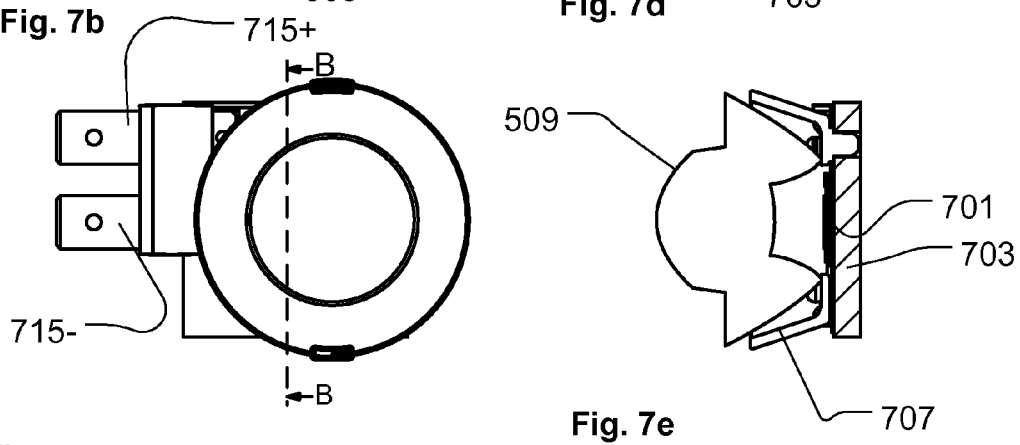
Fig. 7a
Fig. 7b
Fig. 7c
Fig. 7d
Fig. 7e

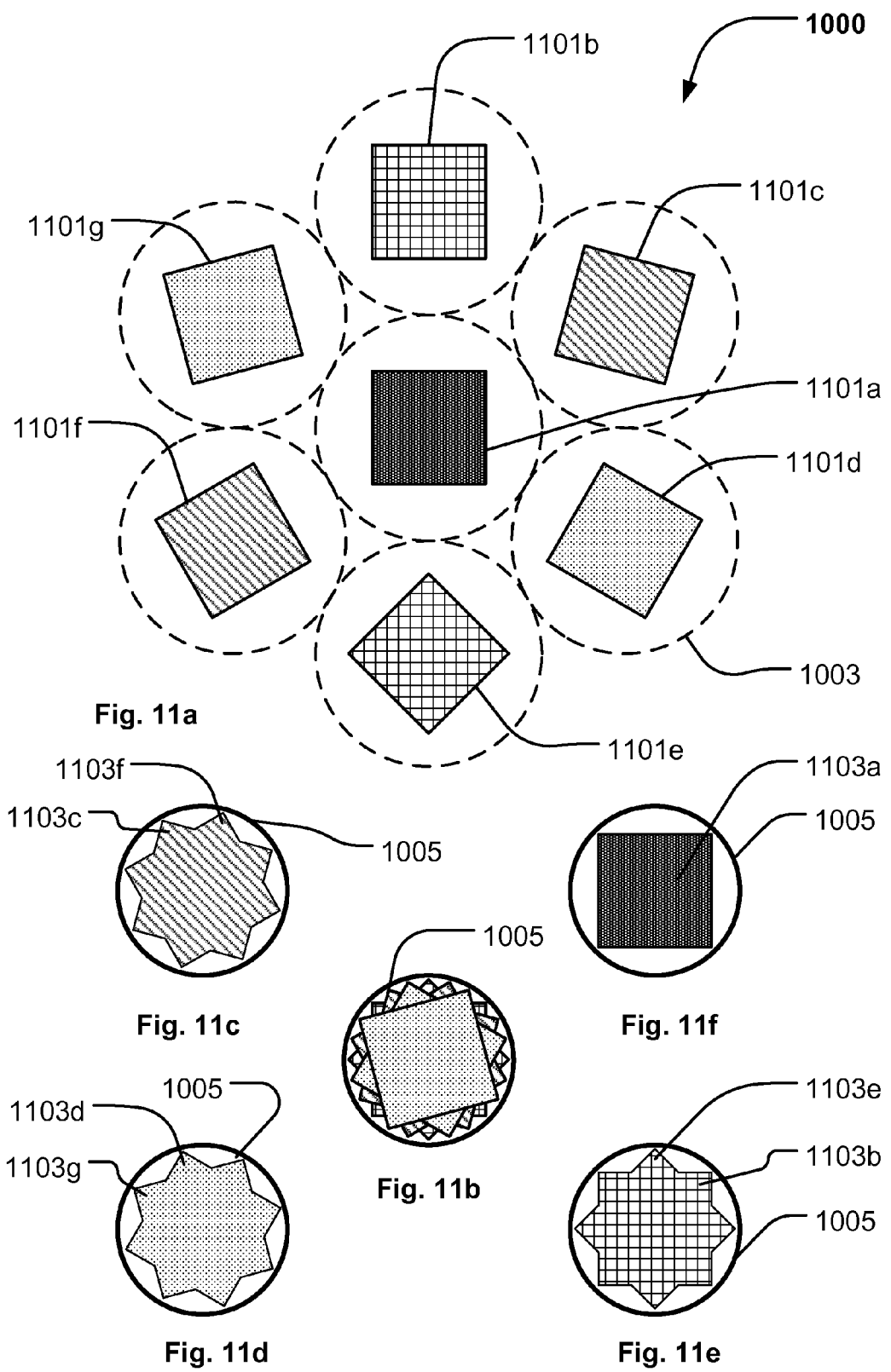

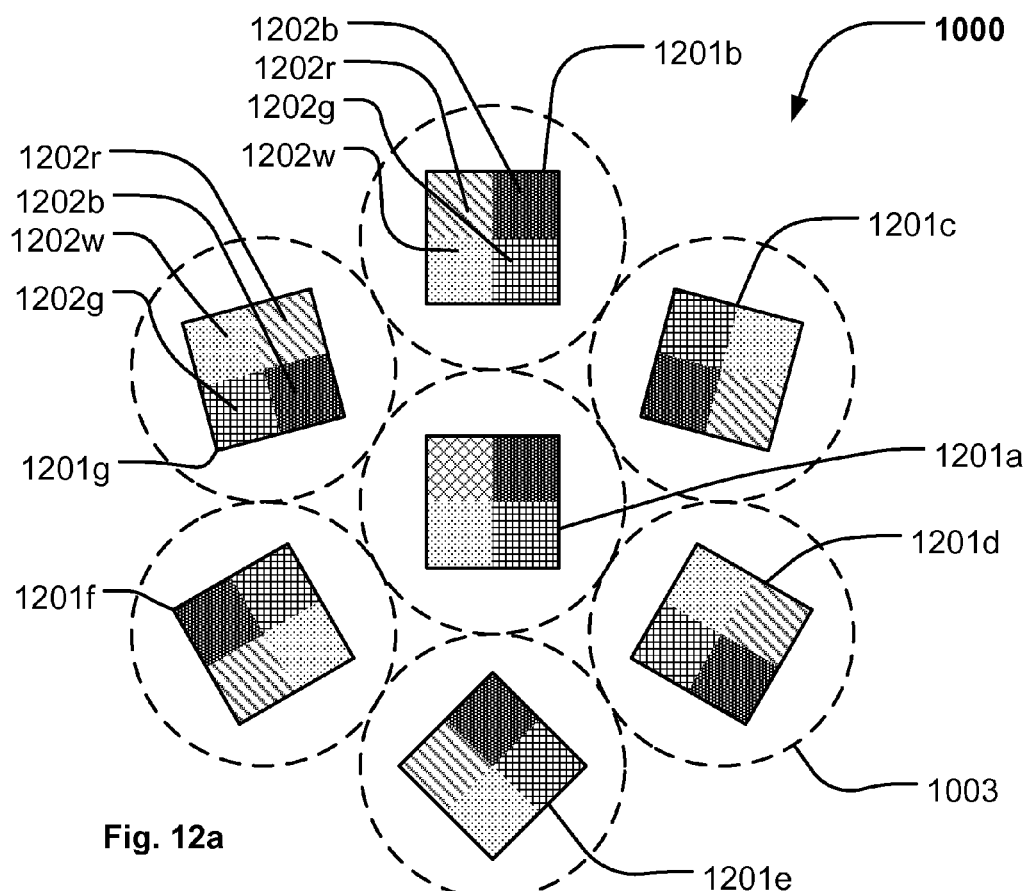
Fig. 12a
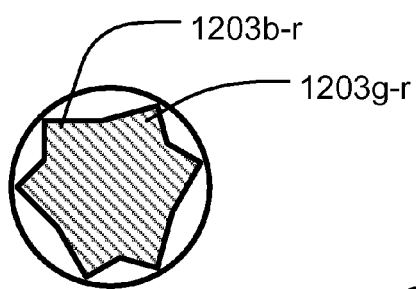
Fig. 12c
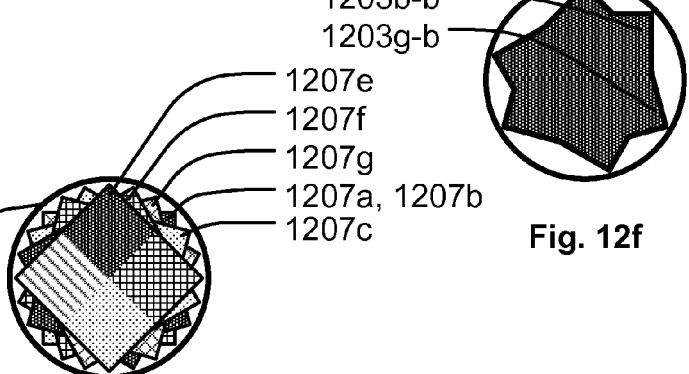
Fig. 12b
Fig. 12f
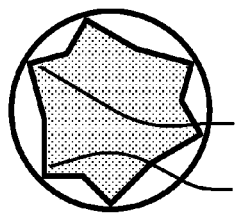
Fig. 12d
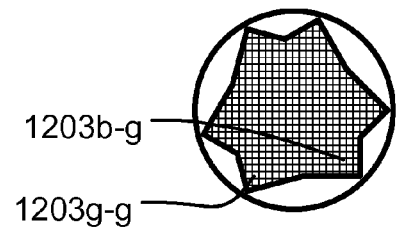
Fig. 12e

PROJECTING ILLUMINATION DEVICE WITH MULTIPLE LIGHT SOURCES

FIELD OF THE INVENTION

The present invention relates to an illumination device illuminating an optical gate and projecting an image of the optical gate towards a target surface. The illumination device comprises a light source module generating light, an aperture delimiting the optical gate and a projecting system adapted to project the optical gate at a target surface.

BACKGROUND OF THE INVENTION

Light emitting diodes (LED) are, due to their relatively low energy consumption, long lifetime, and capability of electronic dimming, becoming more and more used in connection with lighting applications. LEDs are successfully used in lighting applications for general illumination such as, wash/flood lights illuminating a wide area or for generating wide light beams e.g. for the entertainment industry.

However, LEDs have not presently been successfully used in connection with light application systems where an image is created and projected towards a target surface. This is especially the case in connection with entertainment lightning, where a high demand for lumen output and high image quality are required. LED projecting systems have not yet been able to fulfill these requirements.

The light in projecting systems is generally collected into an optical gate where the image is generated, and an imaging optical system projects the gate onto a target surface. WO0198706, U.S. Pat. Nos. 6,227,669 and 6,402,347 disclose lighting systems comprising a number of LEDs arranged in a plane array where a converging lens is positioned in front of the LED in order to focus the light, for instance to illuminate a predetermined area/gate or for coupling the light from the diodes into an optical fiber.

U.S. Pat. Nos. 5,309,277, 6,227,669, WO0198706, JP2006269182 A2, EP1710493 A2, U.S. Pat. No. 6,443,594 disclose lighting systems where the light from a number of LEDs is directed towards a common focal point or focusing area, for instance by tilting the LEDs in relation to the optical axis (JP2006269182 A2, WO0198706, U.S. Pat. No. 5,309,277) or by using individually refracting means positioned in front of each LED (U.S. Pat. Nos. 6,443,594, 7,226,185B, EP1710493).

WO06023180 discloses a projecting system comprising a LED array with a multiple number of LEDs where the light from the LEDs is directed towards a target area. The LEDs may be mounted to a surface of a curved base as illustrated in FIG. 1a or to a surface of a plane base as illustrated in FIG. 1b.

US 2008/0304536 discloses a high intensity lighting apparatus including an outer housing; a curved support disk having an array of diode or laser-based integrated light sources attached thereto disposed within the housing. Each of the light sources include a tube having a laser or diode chip at one end of the tube. The tubes each have at least one concave shaped exit surface on an end opposite the chip, wherein the concave exit surface converges light emitted from each of the light sources to focal points within the housing. A shape of the curved support disk converges the respective focal points into a light beam having a common focal plane. Adjustable secondary optics are disposed in the housing after the focal plane for creating various angles of transmission of the light beam. The laser can be a diode laser, while the diode can be a light-emitting diode (LED). The LED is encapsulated into the tube, where in one embodiment a tube has reflecting surfaces and a hybrid exiting surface. The hybrid exiting surface includes an inner spherical focusing element and outer parabolic focusing elements. Both the spherical 216 and parabolic focusing element 217 and 218 are configured to focus emitted light to the same focal point. The LED is encapsulated into the tube which optically reduces the efficient light emitting area of the LED and it is as a consequence difficult to maintain etendue through the entire optical system. Further it is difficult to design the focusing properties of the tube as focusing is performed by the hybrid exiting surface which constraints the desing options as only two surfaces parts can be adjusted. Yet another issue is the fact the high power LED used today often need cooling which is difficult provide when the LED is encapsulated into the tube.

In general the prior art fixtures try to increase the lumen output by adding as many light sources as possible. The consequence is, however, that the efficiency with regard to power consumption versus light output is very low. Furthermore, a large amount of light is lost as the prior art fixtures typically only couple a central part of the light of the light beams through the gate in order to provide a uniform illumination of the gate, which again reduces the efficiency. The space in light fixtures is often limited and it is difficult to fit many light sources into prior art fixtures, for instance because the optical components associated with the light sources often take up a lot of space. Yet another aspect is the fact that color artifacts often appear in the output from fixtures having light sources of different colors.

DESCRIPTION OF THE INVENTION

The objective of the present invention is to solve or minimize at least some of the above described problems. This can be achieved by the invention as defined by the independent claims. The benefits and advantages of the present invention are disclosed in the detailed description of the drawings illustrating the invention. The dependent claims define different embodiments of the invention.

DESCRIPTION OF THE DRAWING

FIGS. 7a-7e illustrate a light source and a light collector used in the illumination device in FIGS. 5a and 5b;

FIG. 11a-11f illustrate another set up of the light sources in an illumination device;

FIGS. 12a-12f illustrate another set up of the light sources in an illumination device;

DETAILED DESCRIPTION OF THE INVENTION

Figure 1A:
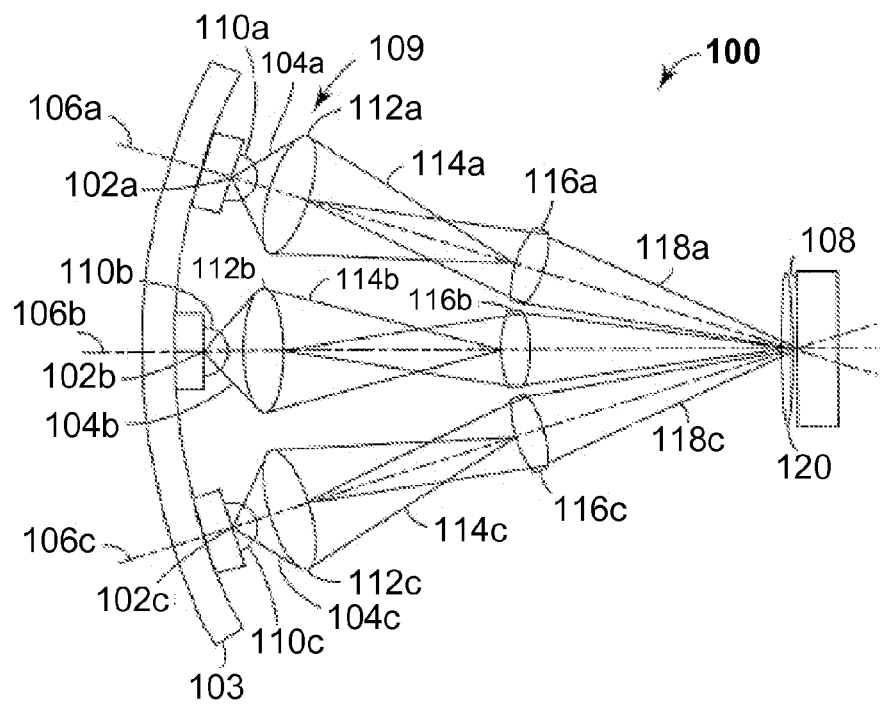
FIGS. 1a and 1b illustrate a prior art illumination system comprising a number of LEDs.

FIG. 1a illustrates an example of a prior art projecting system using multiple numbers of LEDs and shows a projecting system disclosed by WO06023180. The projecting system 100 comprises light generating elements (LEDs) 102a, 102b and 102c arranged to emit light 104a, 104b, 104c along axes 106a, 106b and 106c respectively towards a target area 108 and directed so as to intersect at the center of the target area 108. The target area 108 corresponds to the location of an image generating object.

Light collection units 109 including one or more lenses are used to collect the light 104a, 104b, 104c from each light generating element 102a, 102b and 102c. The light generating elements 102a, 102b and 102c have an associated lens 110a, 110b and 110c. For example, where the light generating elements 102a, 102b and 102c are LEDs, the associated lenses 110a, 110b and 110c are hemispherical lenses formed of a material encapsulating the LEDs. The light collection units 109 include condenser lenses 112a, 112b and 112c. The light generating element 102a has an associated lens 110a and a condenser lens 112a to collect the emitted light 104a. The collected light 114a is generally directed along the axis 106a towards an imaging lens unit 116a. The imaging lens unit 116a is positioned between the target area 108 and the condenser lens 112a so as to relay an image of the condenser lens 112a to a position in proximity to the target area 108. An image of the light generating element 102a may also be formed at the imaging lens unit 116a by the light collection optics 109 and any other lenses associated with the light generating element 102a.

The other light generating elements 102b and 102c each have respective light collecting lenses 110b, 112b and 110c, 112c that direct the emitted light 104b and 104c towards the respective imaging lens units 116b and 116c. The imaging lens units 116b and 116c relay images of the output from the light collection optics—in other words images of the condenser lenses 112b and 112c to the target area 108. The images of the condenser lenses 112a, 112b and 112c overlap at the target area 108 and substantially fill, or may even slightly overfill, the target area 108.

The relayed light 118a and 118c generally propagates along the axes 106a and 106c, respectively. The axes 106a and 106c are tilted around the axis of the target area 108, the axis of the target area is coincident with the axis 106b, but in other examples it may be different. Tilting of the axes 106a and 106c permits the relayed light 118a and 118c to fill the angular space available at the target area 108. The light collection optics 112 of each channel are co-axial with the respective imaging lens unit 116 of that channel, with the result that the light propagates in each illumination channel along a single axis 106 from the light generating element 102 to the target 108. The axes 106a, 106b, 106c may be positioned to pass through the center of the target 108 and be oriented radially so as to accommodate the tangential dimensions of the optical elements associated with each illumination channel. This arrangement increases the intensity of the illumination light received at the target 108. Accordingly, the light generating element 102a, 102b 102c may be mounted to a surface of the curved base 103 that is spherical, with a radius of curvature centered approximately at the center of the target 108.

A field lens 120 may be positioned between the target 108 and the imaging lens units 16 so that the relayed light 118a and 118c stays within the acceptance cone of a imaging system imaging the target area. However, WO06023180 discloses that the light generating elements also may be mounted individually tangentially to an imaginary surface shown as 103.

Figure 1B:
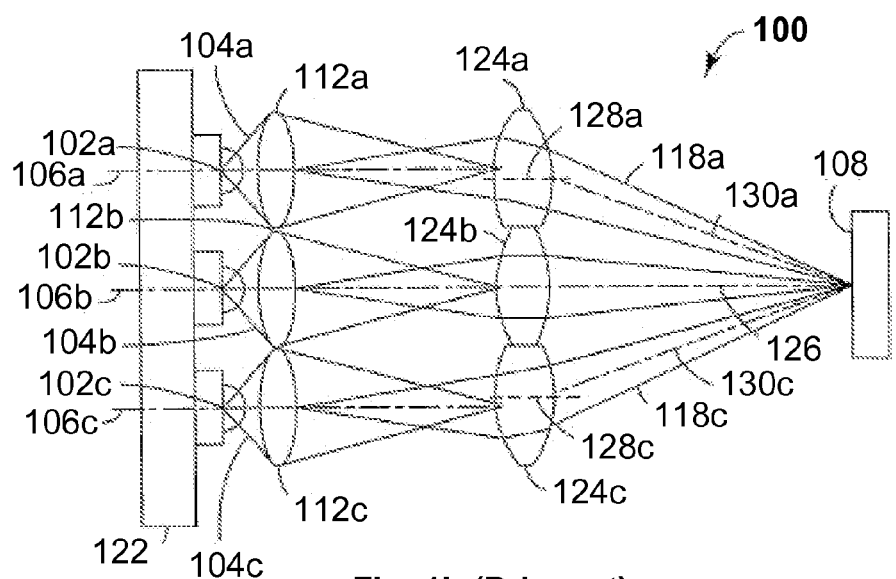

FIG. 1b discloses another embodiment of the illumination system disclosed by WO06023180. The light generating elements 102a, 102b 102c may be mounted on a planar base 122. The light generating elements 102a, 102b, 102c generally emit light 104a, 104b, 104c along their respective emission axes 106a, 106b, 106c. The emission axes 106a, 106b, 106c are parallel and the light 104a, 104b, 104c. in each illumination channel, is collected by respective light collection units 112a, 112b and 112c. The collected light is directed towards respective imaging lens units 124a, 124b and 124c, shown as single lenses. The light generating elements 102a, 102b, 102c may be imaged in proximity to the imaging lens units 124a, 124b and 124c. The imaging lens units 124a, 124b and 124c relay respective images of the closest lens of the light collection unit 112a, 112b, 112c to a position in proximity to the target area 108.

The imaging lens units 124a and 124c that lie off the target axis 126 are axially offset, that is the optical axes 128a, 128c of the imaging lens units 124a, 124c are offset from the axes 106a, 106c of the incident light 104a, 104c. Consequently, after passing through the imaging lens units 124a, 124c, the relayed light 118a, 118c generally propagates along axes 130a, 130c that are not parallel to the target axis 126.

FIGS. 2 to 12 illustrate different embodiments and aspects of the present invention. The person skilled in the art of optics will realize that some of the shown light rays illustrate the principles behind the present invention rather than illustrating exact precise light rays. FIGS. 2a and 2b illustrate a cross section view of an illumination device 200 according to the present invention. FIG. 2a illustrates the general setup of the illumination device, whereas FIG. 2b illustrates other details of the setup. The illumination device comprises a light source module 201, an aperture 203 and a projecting system 205. The light source module generates a light beam (illustrated by thick dashed lines 207) propagating along a primary optical axis 209 towards the aperture 203. The aperture 203 is positioned upstream of the optical axis, with respect to the light source module. The projecting system 205 collects the light which has passed the aperture 203 and projects an image of the aperture 203 onto a target surface (not shown) a given distance from the projecting system. It is thus possible to position an image generating object (not shown) at the aperture 203, whereby the generated image will be projected to the target surface. This aperture is thus defining an object plane and is limiting the object diameter. The image generating object can for instance be a GOBO, a LCD, DMD, LCOS, or any object capable of manipulating the light beam.

The light source module comprises a number of light sources 211a-211c and a number of light collecting means 213a-213c. The light collecting means collect light from the light sources and generate a source light beam (not illustrated in FIG. 2a for simplicity). The source light beam propagates along a source optical axis 215a-215c, and the source optical axes meet in a common volume 217 along the primary optical axis. The common volume is a volume near the primary optical axis where at least one source optical axis intersects a plane through the primary optical axis, and where at least one source optical axis intersects a plane through at least another source axis. The source optical axes can in one embodiment intersect in a common focal point at the primary optical axis but do not; in other embodiments, necessarily intersect in a common focal point and can thus intersect in the common focal volume.

The projecting system 205 has an acceptance angle relative to the primary optical axis. The acceptance angle relative to the primary optical axis defines the maximum angle that a light beam can have in relation to the primary optical axis in order to be projected by the projecting system. Light beams having a larger angle relative to the primary axis will be lost in the optical system. The acceptance angle of a spherical symmetrical projecting system is given as:

$$\frac{\alpha}{2} = \arctan\left(\frac{D/2}{f}\right)$$

where α is the acceptance angle of the projecting system and f is the resulting focal length of the projecting system 205. D is the diameter of the entrance pupil of the projecting system, where the diameter of the entrance pupil is defined as the limiting diameter of the projecting system as seen from the object plane 203 through the front of the first lens. The limiting diameter of the projecting system is defined by the resulting acceptance area of the projecting system. The projecting system is illustrated as a single lens, but the person skilled in the art would understand that the projecting system can comprise any number of lenses and other optical elements, and even be a zoom system with variable focal length. The resulting focal length and resulting acceptance area of the projecting system is thus defined by the optical elements of the projecting system and the skilled person would be able to determine these based on her/his ordinary skills.

Figure 2A:
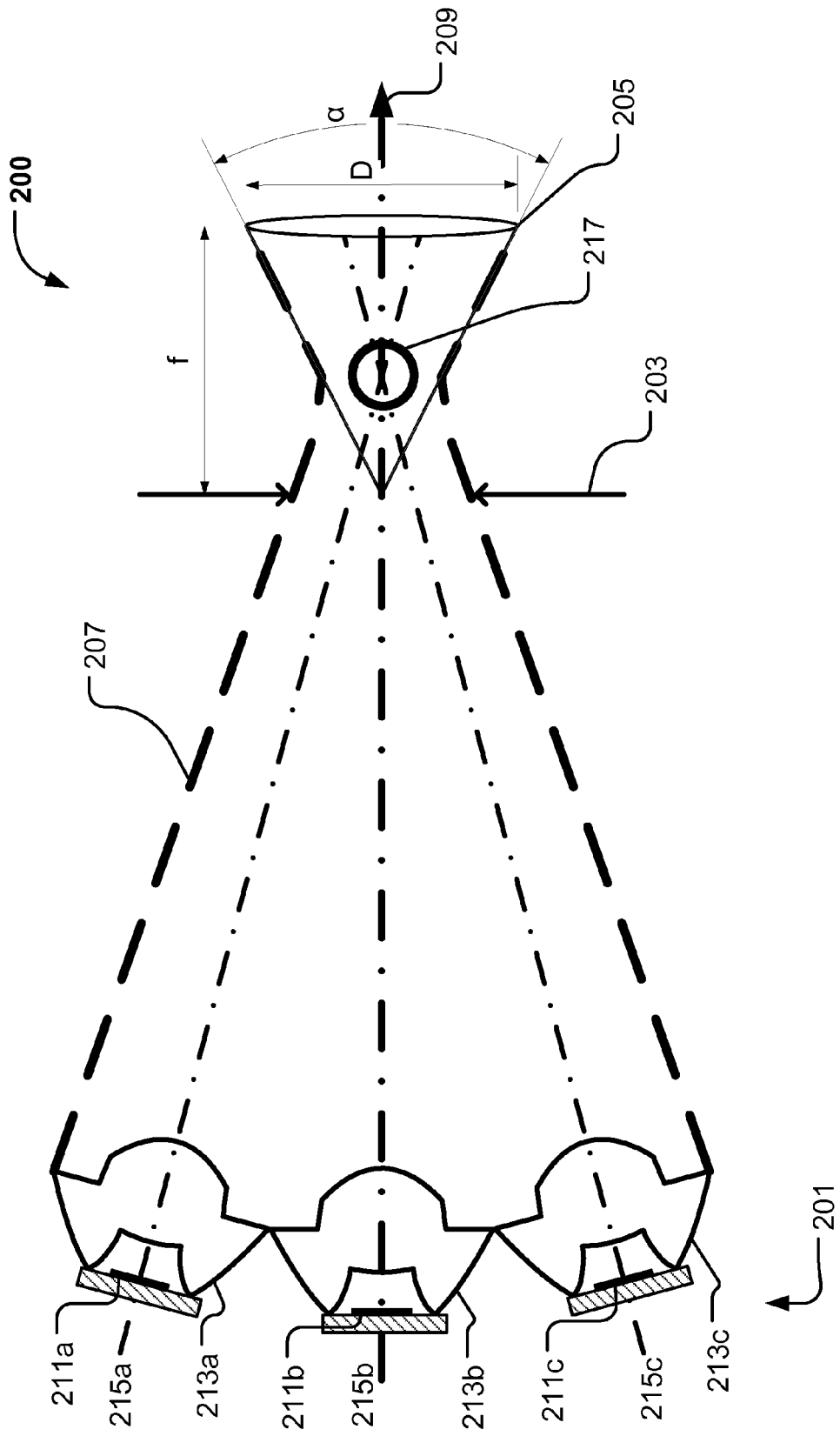
FIGS. 2a and 2b illustrate an illumination device according to the present invention.
Figure 2B:
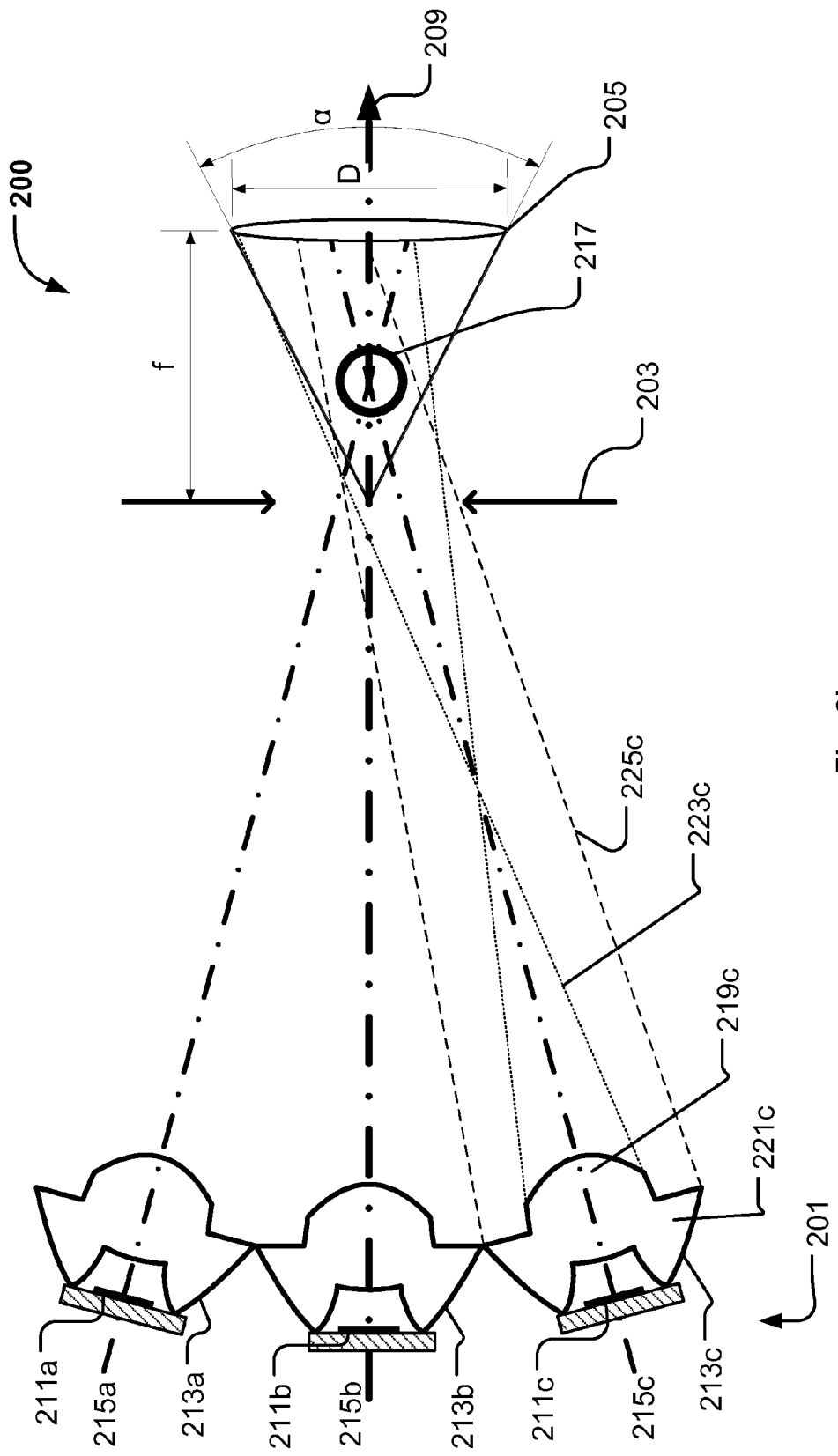

FIG. 2b illustrates the source light beam generated by light sources and light collection means and is for the simplicity of the drawing in FIG. 2b illustrated in connection with light source 211c and light collection means 213c. The skilled person will understand that a similar description applies to the other light sources 211a and 211b and light collection means 213a and 213b and will be able to apply this teaching to these light sources. Further, another number of light sources can be used in other setups. Light collecting means 213c comprise a central lens 219c aligned along the source optical axis 215c, and a peripheral lens 221c at least partially surrounding the central lens. The central lens 219c collects a first part of the light generated by the light source 211c and generates a first source light beam part 223c (illustrated by dotted lines). The peripheral lens collects a second part of the light generated by the light source 211c and generates a second source light beam part 225c (illustrated by dashed lines).

The central lens is further adapted to image the light source 211c at a position approximately between the aperture and the entrance pupil of the projecting optics. That the image of the light source can thus be created in a position starting for a small distance in front of the aperture and ending at a small distance after the entrance pupil of the projecting system. The small distance in front of the aperture does not exceed the cross section of the aperture and the small distance after the entrance pupil does not exceed the cross section of the entrance pupil. It is hereby possible to optimize to optical system to provide a uniform illumination of the aperture and at the same time collect much of the light by the projecting system.

The image of the light source can in one embodiment be positioned proximately to the aperture whereby the sharp contrast of the contours of the light source is created at the aperture plane. The position proximately to the aperture does not exceed distance in front of the aperture larger than the cross section of the aperture and a distance after the aperture larger than the diameter of the aperture. This is advantageous when the light source has a homogeneous light distribution across its cross section and/or when the shape of the light source is substantially identical to the shape of the aperture (e.g. both circular). The light source is in one embodiment a LED die and the central lens is designed so that the image of the LED die is placed at the proximately to aperture and is large enough for the aperture to be inscribed by the image of the source. The image can in other embodiments be moved away from the aperture whereby a defocused image of the light source is created at the aperture. This is advantageous in situations where the shape of the light source is not identical to the aperture as it is possible to make a defocused image where the contours of the light source is defocused in order to make a closer match between the shape of the light source and the aperture (e.g. rectangular light sources and circular apertures or the opposite). The image of the light source can in one embodiment be positioned proximately to the entrance pupil of the projecting system, whereby almost most of the light created by the central part of the light source is collected by the projecting system. It is further achieved that the projecting system can not image the image of the light sources at the target surface. The position proximately to the entrance pupil does not exceed distance in front of the entrance pupil larger than the cross section of the aperture and a distance after the entrance pupil larger than the diameter of the aperture. The central lens can also be adapted to distort the image of the light source, for instance a barrel distortion where magnification decreases with the distance from the optical axis, pincushion distortion where magnification increases with the distance from the optical axis or a combination of the two. Further, the central lens can be adapted to provide aspherical focusing or distortion of the image in proximity to the aperture plane. An image of the light source is thus created near the aperture and the contour of the light source is thus at least visible at the aperture. Further, the central lens can be no-rotational symmetrically in order to compensate for a square or rectangular die, and in this way achieve the best compromise between light distribution in the aperture and optical efficiency.

The peripheral lens part 221c is further adapted to concentrate the second light beam part approximately between the aperture and the entrance pupil of the projecting optics. The peripheral lens will thus collect the outermost light beams from the light source and redirect these towards the aperture such that substantially all light collected by the peripheral light beam lies within and passes the aperture within the acceptance angle of the projecting optics. The second light beam part can in one embodiment be concentrated proximately to the aperture while the image of the light source is positioned proximately at the entrance pupil, whereby most of the peripheral part of the light can be used to illuminate the aperture and image of the light source if further avoided at the target surface.

Figure 3A:
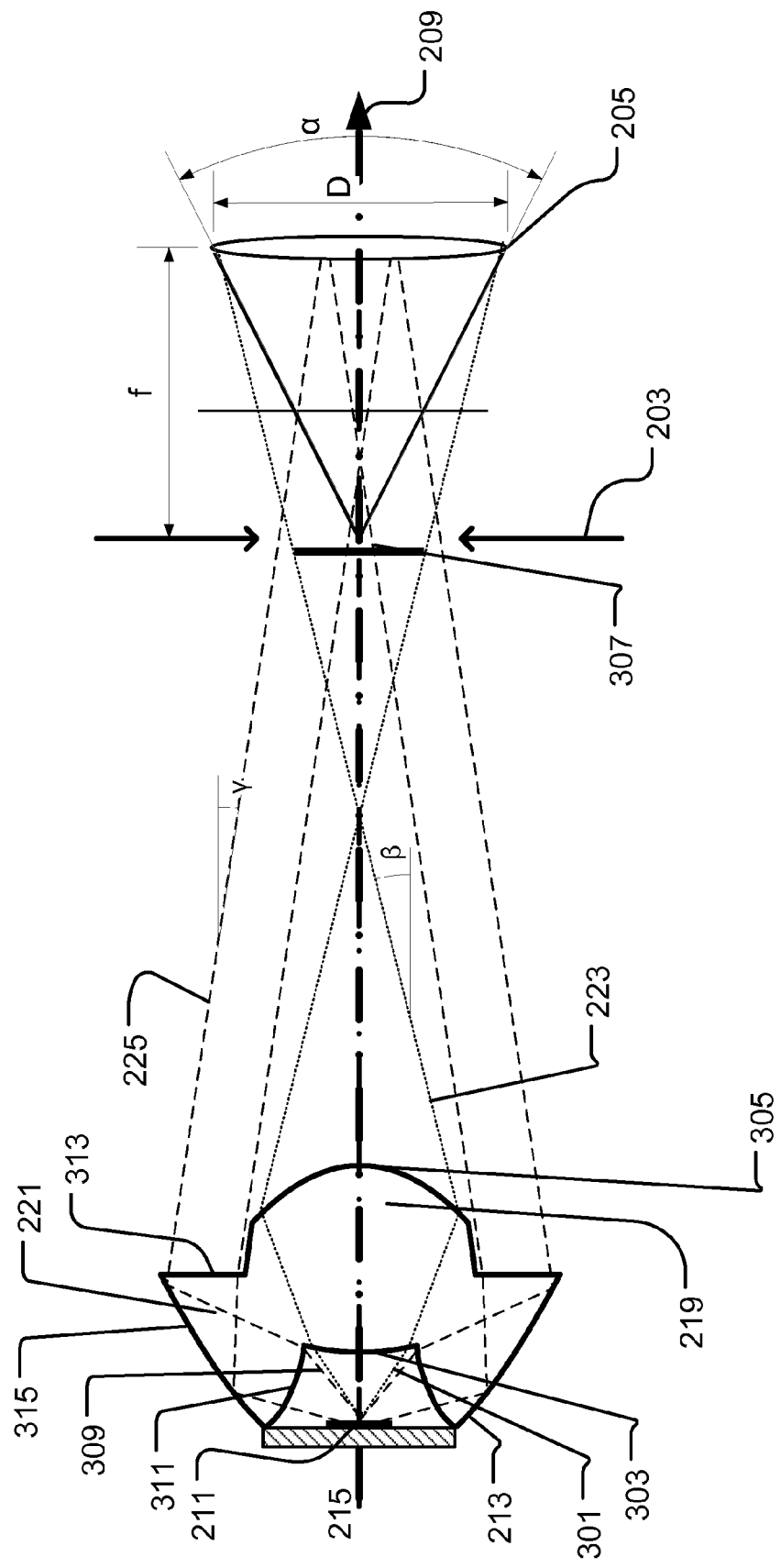
FIGS. 3a and 3b illustrate different setups of the light source and light collection means in the illumination device according to the present invention.

FIG. 3a illustrates an example of a light source 211 and its corresponding light collection means 213 used in the illumination device according to the present invention. The light from the light source and the light collection means creates a light source light beam propagating along a source optical axis 215.

The light collection 213 means comprises a central lens part 219 collecting a central part 301 of the light generated by the light source and generates a first source light beam part 223 (illustrated by dotted lines). The central lens 219 comprises a central entrance surface 303 and a central exit surface 305 which refract the central light beams 301 such that an image 307 of the light source is created at a distance along the source optical axis 215. The central lens part can be adapted to provide a magnified, demagnified or 1 to 1 image of the light source. The first source light beam part 223 has a divergence angle β in relation to the source optical axis 215. The divergence angle β of the first source light beam in relation to the source optical axis is defined by the optical properties of the central lens and the size of the light source.

The light collection means 213 also comprises a peripheral lens part 221 at least partially surrounding the central lens part 219. The peripheral lens 221 comprises an entrance surface 311, an exit surface 313 and a reflective surface 315. The second part 309 of the light generated by the light source enters the peripheral lens through the entrance surface 311; it is thereafter reflected by the reflection surface 315 and exits the peripheral lens through the exit surface 313. The reflection on reflection surface 315 can for instance be based on total internal reflection or the reflection surface can comprise a reflective coating. The peripheral lens thus collects a second (peripheral) part 309 of the light generated by the light source 211 and generates a second source light beam part 225 (illustrated by dashed lines). The relationship between the entrance surface, the reflection surface and the curvature of the surfaces defines the appearance of the second source light beam, and the second light source beam has a divergence γ in relation to the source optical axis 215. Although it appears like the inner and outer light rays of the second source light beam have identical divergence angles in relation to the source optical axis 215, the skilled person would realize that the peripheral lens can be adapted to provide different divergence angles for the inner light rays and the outer light rays. The central part and the peripheral part of the light collecting means can be designed to have different divergent angles, and/or intensity distributions in the aperture. The particular design and combination of the two parts can thus be used to control the light distribution in the aperture.

The second light beam part 225 is in the illustrated step adapted to slightly surround the image 307 of the light source in proximity to the aperture, and the second light beam part can, in this situation, compensate for a potential mismatch between the shape of the light source and the aperture—e.g. in the case where the light source is rectangular and the aperture is circular. The second source light beam part 225 can in this situation fill out missing parts in the aperture. Today, for instance most LEDs, are embodied as a rectangle in order to match the requirements for display system/video projectors. The aperture is in contrast hereto, in connection with entertainment lighting, typically circular. It is thus possible in an efficient way to create an entertainment projecting device.

Figure 3B:
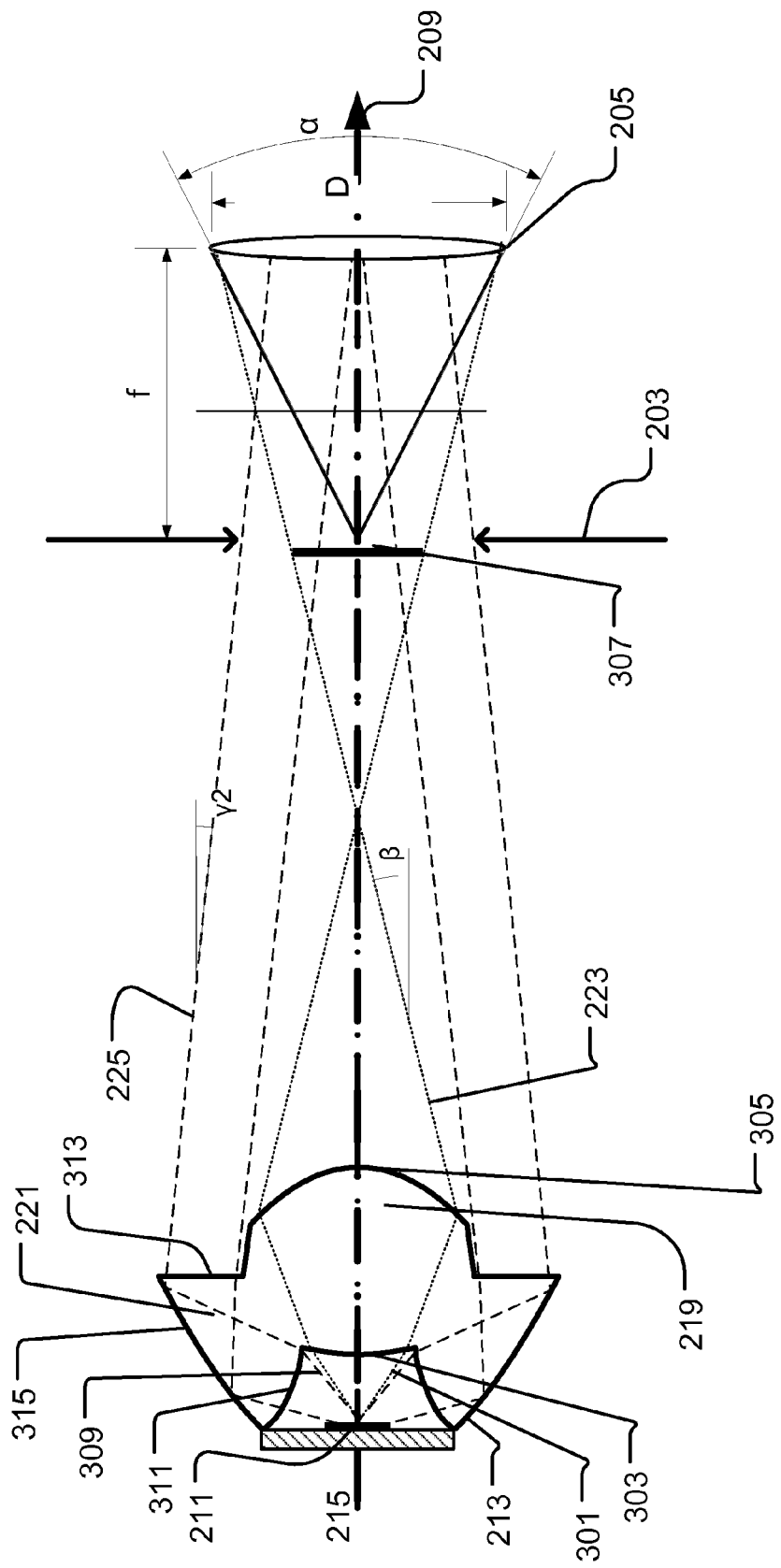

It is to be understood that the amount of the second light beam that extends the image of the light source can be increased or decreased by adjusting the optical properties of the peripheral lens part 221. FIG. 3b illustrates a situation where the amount of the second light beam that surrounds the image of the light source has been increased. The divergence angle γ2 of the second light beam has thus been decreased compared to the divergence angle γ of the second light beam in FIG. 3a. The second light beam can also be concentrated at the center of the image of the light source for instance in order to create a "hot" spot at the center. The divergence of the second light beam is in this situation increased.

Figure 4:
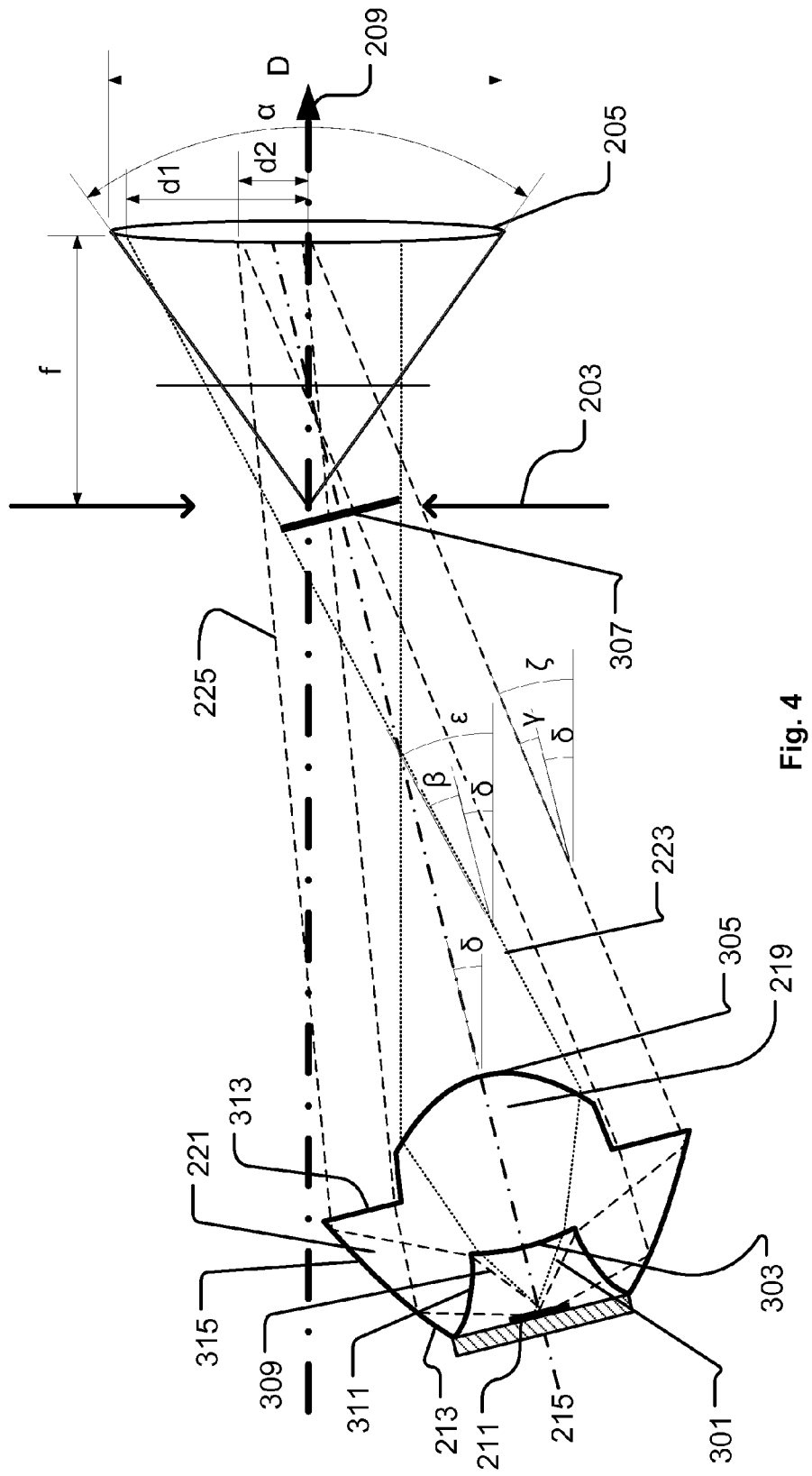
FIG. 4 illustrates a setup where the light source and the light collection means have been tilted and positioned in an offset manner.

FIG. 4 illustrates a situation where the light source 211 illustrated in FIG. 3a is positioned in a position offset and tilted in relation to the primary optical axis 209 as the case is for light sources 215a and 215c in FIG. 2a. The light source optical axis 215 is angled δ in relation to the primary optical axis. The maximum divergence angle ε of the first source light beam part 223 in relation to the primary optical axis 209 increases as a result of the angling of the source optical axis 215 in relation to the primary optical axis 209. The maximum divergence angle ε is defined as the sum of the angle δ of the source optical axis 215 in relation to the primary optical axis 209 and the divergence angle β of the first source light beam in relation the source optical axis.

The maximum divergence angle ζ of the second source light beam part 225 in relation to the primary optical axis 209 increases in a similar way, and the maximum divergence angle ζ is defined as the sum of the angle δ of the source optical axis 215 in relation to the primary optical axis 209 and the divergence angle γ of the first source light beam in relation the source optical axis.

The skilled person would further realize that the divergence angle of the first source light beam part 223 and the second light beam part 225 in relation to the primary optical axis 209 would decrease with regard to the light rays which lie between the source optical axis and the primary optical axis.

The light sources are in one embodiment of the present invention tilted in relation to the primary axis in such a way that the maximum divergence angles ε and ζ of the first source light beam part and the second source light beam part are smaller than the acceptance angle α/2 of the projecting system 205 in relation to the primary optical axis. This ensures that projection system 205 is capable of collecting the light.

The light sources are further in one embodiment positioned such that the maximum distance/height d1 of the first source light beam part in relation to the primary optical axis at the entrance pupil 401 is smaller than the height of D/2 defined by the resulting acceptance area of the projecting system. The maximum distance/height d2 of the second source light beam part in relation to the primary optical axis at the entrance pupil 401 is similar in one embodiment and is also smaller than the height of D/2 defined by the resulting acceptance area of the projecting system. This ensures that the light rays hit the entrance pupil of the projecting system and thus are also collected by the projecting system if the light rays also lie within the acceptance angle of the projecting system.

The person skilled in the art will realize that these requirements can be fulfilled for instance by optimizing the optical properties of the light collecting means 213 or projecting system 205, by optimizing the tilting and positioning of the light sources, by adapting the aperture etc.

The image 307 is in the illustrated setup angled in relation to the primary optical axis 209, but it is also possible to adjust the optical properties of the central lens part so that the image is perpendicular to the primary optical axis. This can for instance be achieved by tilting the central lens part.

For simplicity, FIGS. 3a, 3b and 4 illustrate one light source, but the skilled person will realize that a plurality of light sources can be used. Further, the figures illustrate only a few setups, and the person skilled in the art will be able to construct other embodiments within the scope of the claims.

Figure 5A:
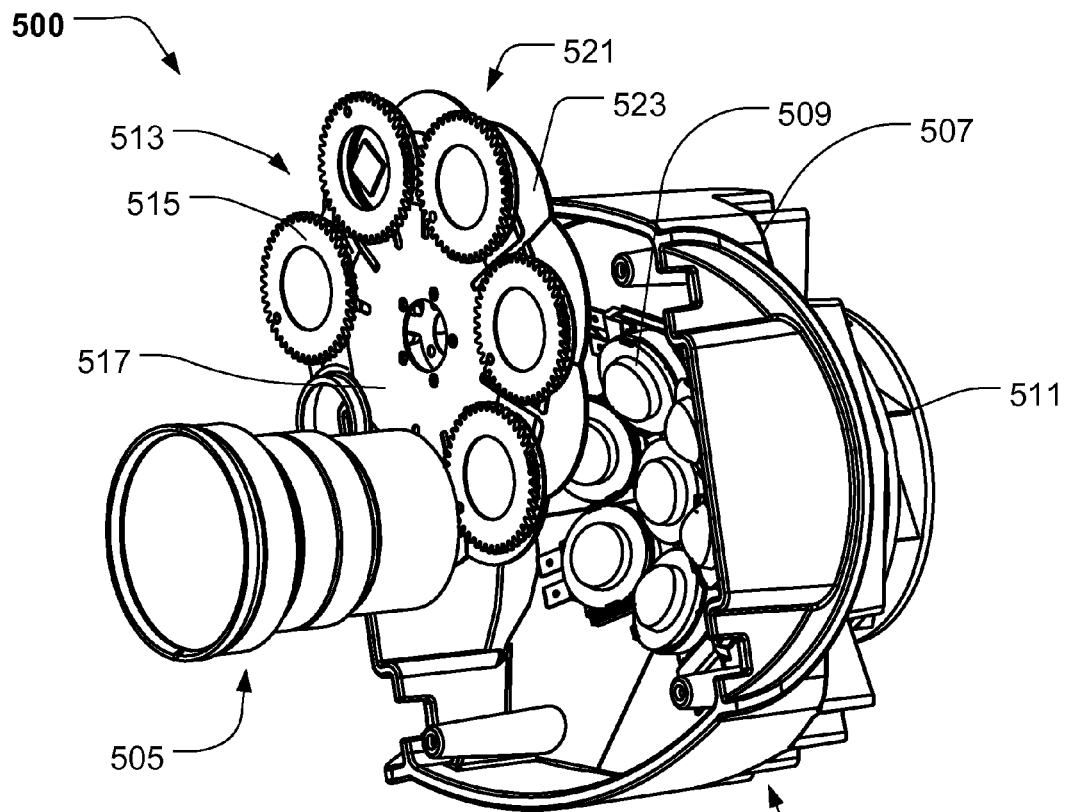
FIGS. 5a and 5b illustrate an embodiment of the illumination device according to the present invention.
Figure 5B:
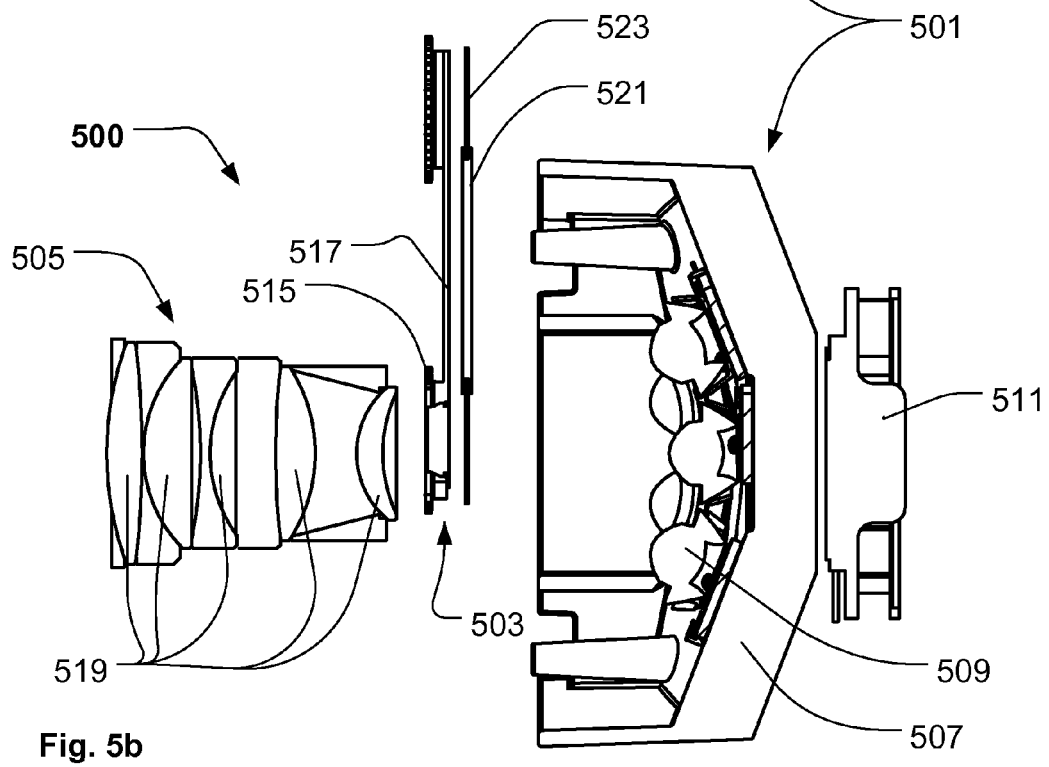

FIGS. 5a and 5b illustrate a possible embodiment of the illumination device according to the present invention, where FIG. 5a and FIG. 5b, respectively, illustrate a perspective view and a cross sectional view of the illumination device. The illumination device is here embodied as a gobo projector 500 adapted to image the gobo onto a target surface. The gobo projector comprises a light source module 501, aperture 503 and projecting system 505 arranged as described above.

The light source module comprises a number of LEDs mounted onto a cooling module 507 (illustrated in further detail in FIGS. 6a and 6b) and below a number of TIR (Total Internal Reflection) lenses 509. The light source module further comprises blowing means (511) in the form of a fan adapted to force air towards a number of cooling fins on the backside of the cooling module. The TIR lenses act as light collecting means and collect and direct, as described above, the light from the LEDs towards the aperture and projecting system.

The gobo projector 500 comprises a gobo wheel 513 comprising a number of gobos 515 mounted on a rotating carousel 517 as known in the art of entertainment lighting. The gobo wheel can for instance be embodied as described in U.S. Pat. Nos. 5,402,326, 6,601,973 and 6,687,063 or US2009/0122548 incorporated herein by reference. Each gobo can be moved into aperture 503 by rotating the carousel. The projecting system is adapted to create an image of the gobo at a target surface (not shown) and comprises a number of optical lenses 519.

The illustrated gobo projector further comprises a color wheel 521 comprising a number of optical filters 523 (e.g. dichroic filters, color gels or the like) which can also be positioned into the light beam. The color wheel is useful in the case that the light sources produce a white light beam and can be used to create a certain color of the light beam. The color wheel is, however, optional, as it can be omitted in the case where the light sources are of different colors and adapted to perform additive color mixing as known in the art of dynamic lighting. This is for instance possible by having a number of red, green and blue LEDs where the color mixing is based on the intensity of the different colors. The intensity of the different colors can for instance be controlled by the commonly known pulse width modulation (PWM) method, or by adjusting the DC current through each color LED.

Figure 6A:
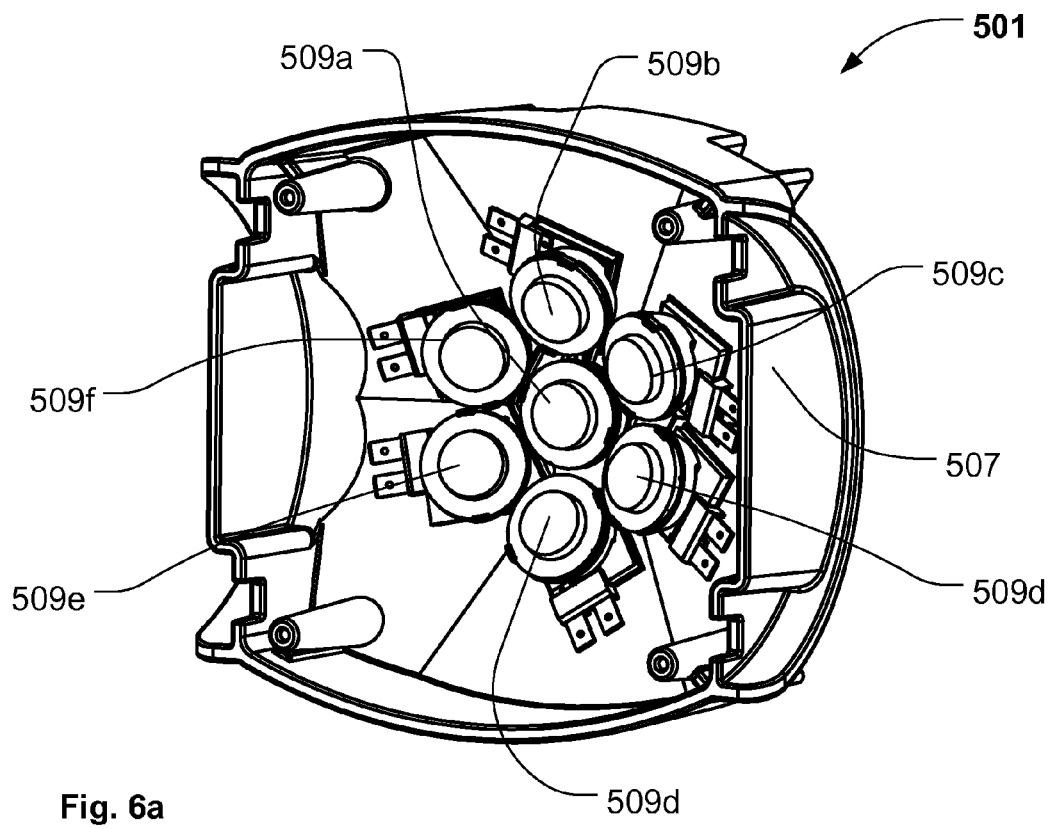
FIGS. 6a and 6b illustrate a cooling module used in the illumination device illustrated in FIGS. 5a and 5b.
Figure 6B:
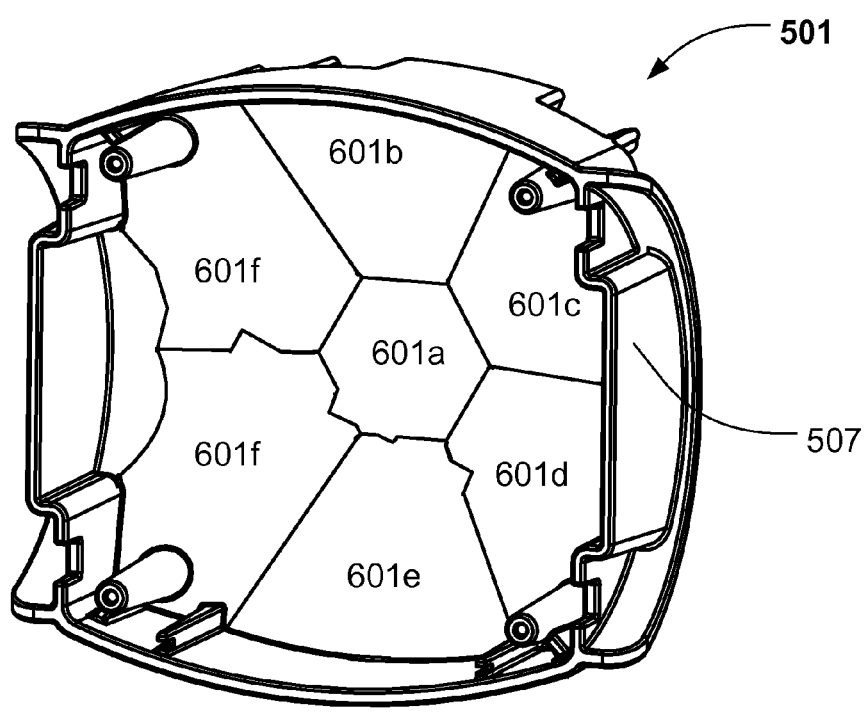

FIGS. 6a and 6b illustrate a perspective front view of the light source module 501 used in the gobo projector illustrated in FIGS. 5a and 5b. FIGS. 6a and 6b illustrate the light module with LEDs and without LEDs, respectively. The light source module comprises a cooling module 507 having a first side comprising a number of plane mounting surfaces 601a-601f whereto a LED and its corresponding TIR lens (509a-509f) are mounted. Center mounting surface 601a is mounted perpendicularly to the optical axis, and the LED and TIR 509a lens are positioned such that the primary optical axis goes through the LED and TIR lens 509a. The peripheral mounting surfaces 601b-601f are angled relative to mounting surface 601a, and the light from the LEDs is directed towards the aperture. The angle of the peripheral mounting surfaces is determined such that the light emitted by the LEDs will hit the projecting system within the acceptance angle and cross section of the projecting system as described above. The plane mounting surfaces make it possible to mount the LEDs on plane circuit boards secured to the plane mounting surfaces. The result is that the heat generated by the LED can be dissipated from the circuit board through the plane mounting surfaces very easily as it is possible, in contrast to curved mounting surfaces, to provide tight contact over a large contact surface between the circuit board and the plane mounting surface. The different mounting surfaces are further interconnected resulting in the fact that heat from neighboring LEDs can be dissipated at least partially away through the neighboring mounting surface. This is useful in the case where different color LEDs are used and where some LEDs might periodically be turned off. LEDs which are turned on can in this case use the mounting surface and heat sink area related to turned off LEDs whereby more heat can be dissipated. The second side, which is opposite the first side, of the cooling module can comprise a number of cooling fins improving the cooling effect of the LED.

FIG. 7a-7e illustrate a LED module used in the gobo projector illustrated in FIGS. 5 and 6. FIG. 7a illustrates a perspective view, FIG. 7b a side view, FIG. 7c a top view, FIG. 7d a cross section view along line A-A of FIG. 7b and FIG. 7e a cross section view along line B-B of 7c.

The LED die 701 is mounted on a metal core circuit board 703, and the TIR lens 509 is secured to the metal core circuit board by a lens holder 705. The lens holder comprises main body part 707 at least partially surrounding the TIR lens 509. The lens holder further comprises a number of engaging hooks 709 protruding from the main body 707 and adapted to engage with the upper part of the TIR lens. The TIR lens is thus positioned inside the main body and is secured by the engaging hooks 709. The main body 705 is through two securing holes 711 secured to the circuit board by two screws, nails, rivets or the like 713. The securing holes extend in the illustrated embodiment inwardly in the main body 707 but can also extend outwardly from the main body. The circuit board comprises two leads (one negative 715− and one positive 715+) whereto electrical power for driving the LED can be connected.

The TIR lens is embodied as a light collector collecting light emitted by the LED and comprises a central lens part aligned along the optical axis of the LED axis and having a central entrance surface and a central exit surface. The TIR lens also has a peripheral lens surrounding at least a part of the central lens. The peripheral lens comprises a peripheral entrance surface, a peripheral reflection surface and a peripheral exit surface.

Figure 8A:
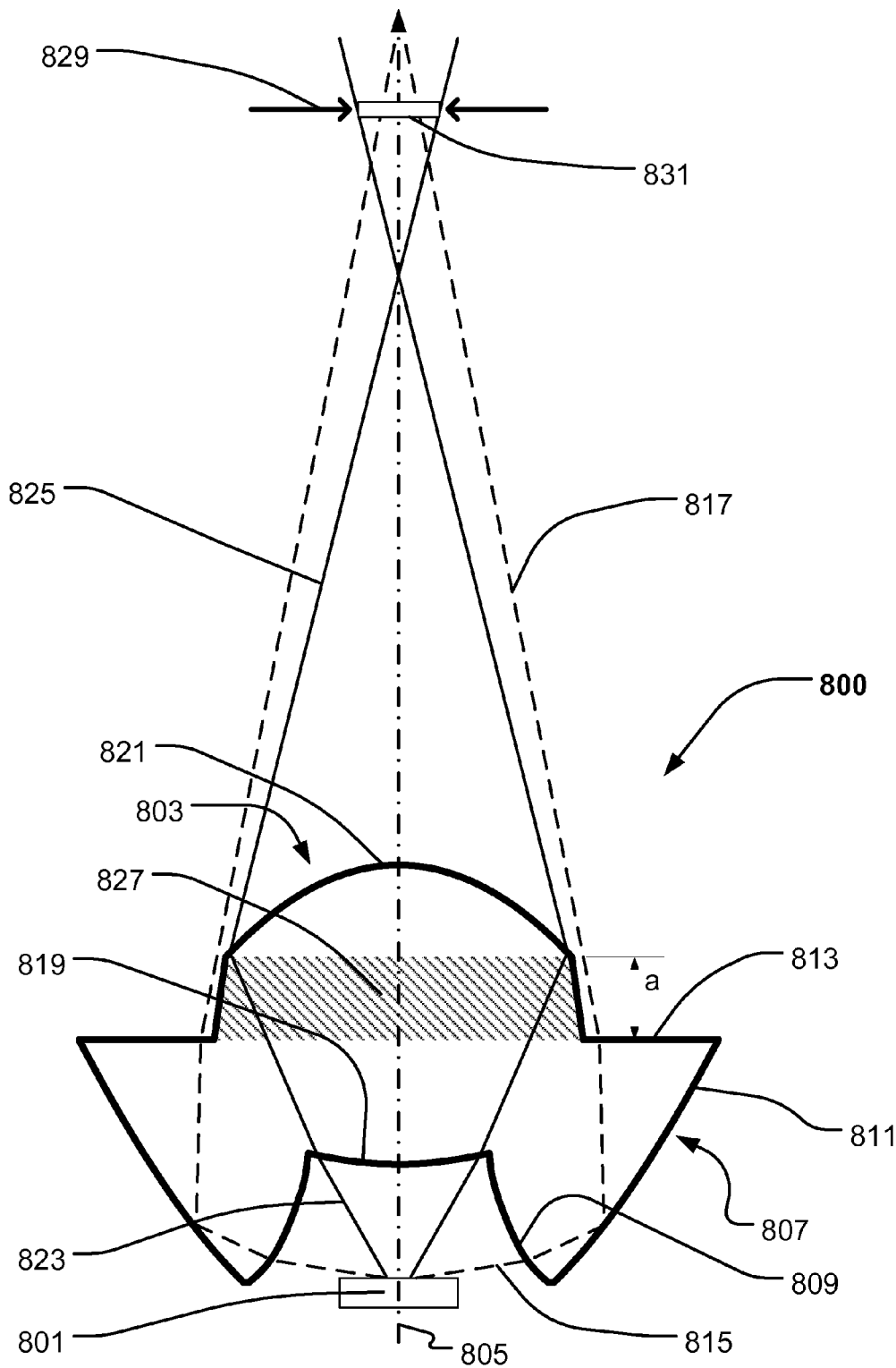
FIGS. 8a and 8b illustrate a light collector according to the present invention.

FIG. 8a illustrates a light collector 800 according to one aspect of the present invention. The light collector collects light emitted by a light source 801 and converts the collected light into a light beam. The light collector comprises a central lens part 803 aligned along the optical axis 805 of the light source and a peripheral lens part 807 surrounding at least a part of the central lens 803.

The peripheral lens part comprises a peripheral entrance surface 809, a peripheral reflection surface 811 and a peripheral exit surface 813. The peripheral part 815 of the light emitted by the light source enters the peripheral lens part through the peripheral entrance surface and is reflected by the peripheral reflection surface before leaving the peripheral lens through the peripheral exit surface 813. The peripheral part of the emitted light is hereby converted into a second light beam part 817.

The central lens part comprises a central entrance surface 819 and a central exit surface 821. A central part of the light 823 emitted by the light source enters the central lens through the central entrance surface 819 and leaves the central lens through the central exit surface 821 whereby the central part of the emitted light is converted into a first light beam part 825. The central lens also comprises an extension part 827 (marked as a scratched area) positioned between the central entry surface and the central exit surface. The extension part protrudes from the peripheral exit surface 813 and elevates the central exit surface a distance above the peripheral exit surface. The first and second light beam parts can for instance be coupled through an aperture 829 along the optical axis.

This light collector has reduced cross section dimensions compared to traditional light collectors. The cross section dimensions of the light collector can be reduced by providing the central lens part with an extension part, as the cross section dimension defined by the peripheral part can be reduced without changing the optical properties of the central lens part. It is thus possible to position a multiple number of light sources close together in an array and increase the efficiency as the amount of light that can be coupled through the aperture is increased. To combine light from several sources and light collectors into an aperture within a limited acceptance angle defined by the projection optics in an efficient way requires light collectors which deliver light in the aperture with the smallest possible divergent angle. To obtain the smallest divergent angle from the center part of the light collector, the lens should have as long a focal length as possible and be positioned to image the source as infinity. This means that moving the lens further away from the light source decreases the divergent angle from the center part. Moving the peripheral exit surface 813 of a fixed the TIR lens having a maximum diameter further away from the aperture reduces the maximum divergent angle of the light from the peripheral exit surface. Therefore, to deliver maximum light from the source within a limited divergent angle, the center part of the light collector should have a center lens part extended with respect to the peripheral part.

The central lens part is in one embodiment adapted to provide an image 831 of the light source a distance along the optical axis. The aperture 829 can in this way be illuminated in a way whereby most of the central part of the light emitted by the light source is coupled through the aperture. A very efficient incoupling of light through the aperture 829 is provided. It is further possible to create a projecting system where most of the central light is coupled into a projecting system (not shown in FIG. 8).

The image of the light source can be inscribed by the second light beam part. This is useful in the case that the shape of the light source is different from the shape of an aperture along the optical axis, as the second light beam part can be used to fill out missing parts of the image of the light source.

The central lens part can also be adapted to distort the image of said light source. It is in this way possible to deform the image of the light source such that it matches the shape aperture.

The peripheral lens part can be adapted to concentrate the peripheral part a distance along said optical axis. It is in this way possible to provide a "hot" spot along the optical axis.

In another embodiment the peripheral lens part and the central lens part can be adapted to a specific combined light distribution in the aperture 829 as wished.

Figure 8B:
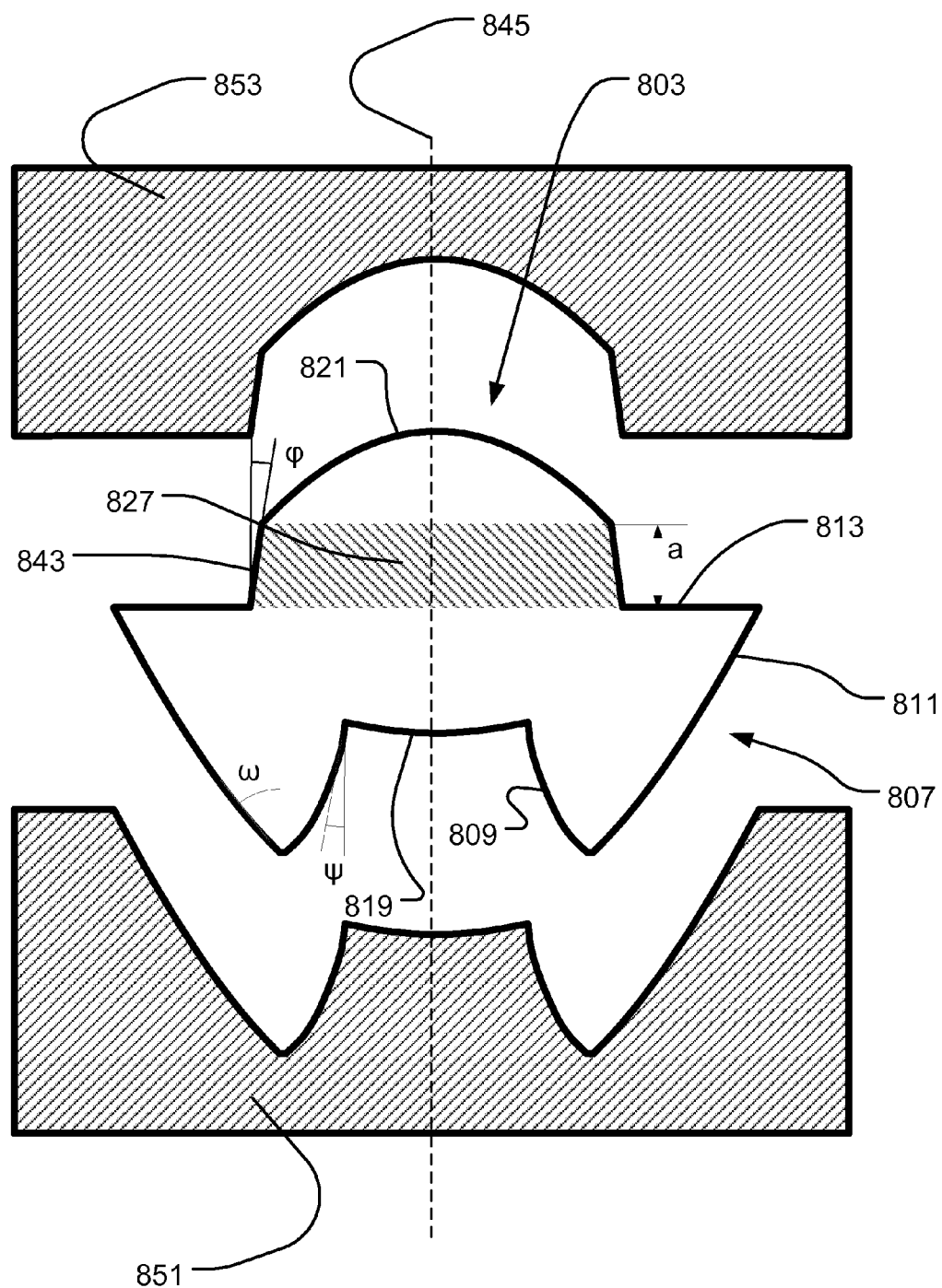

FIG. 8b illustrates the light collector 800 in connection with a lower molding tool 851 and an upper molding tool 853. The molding tools are moved together along the central axis 845 of the light collector, and the light collector material is hereafter filled (not shown) into the cavity between the two molding tools. The slip angle φ of the outer surface 843 of the extension part, the slip angle ψ of the peripheral entrance surface 809 and the angle ω of the peripheral reflection entrance surface 811 are at least 1 degree in relation to central axis 845 of the light collector. This ensures that the molding tools can be moved away from each other without destroying the light collector.

Figures 9A, 9B:
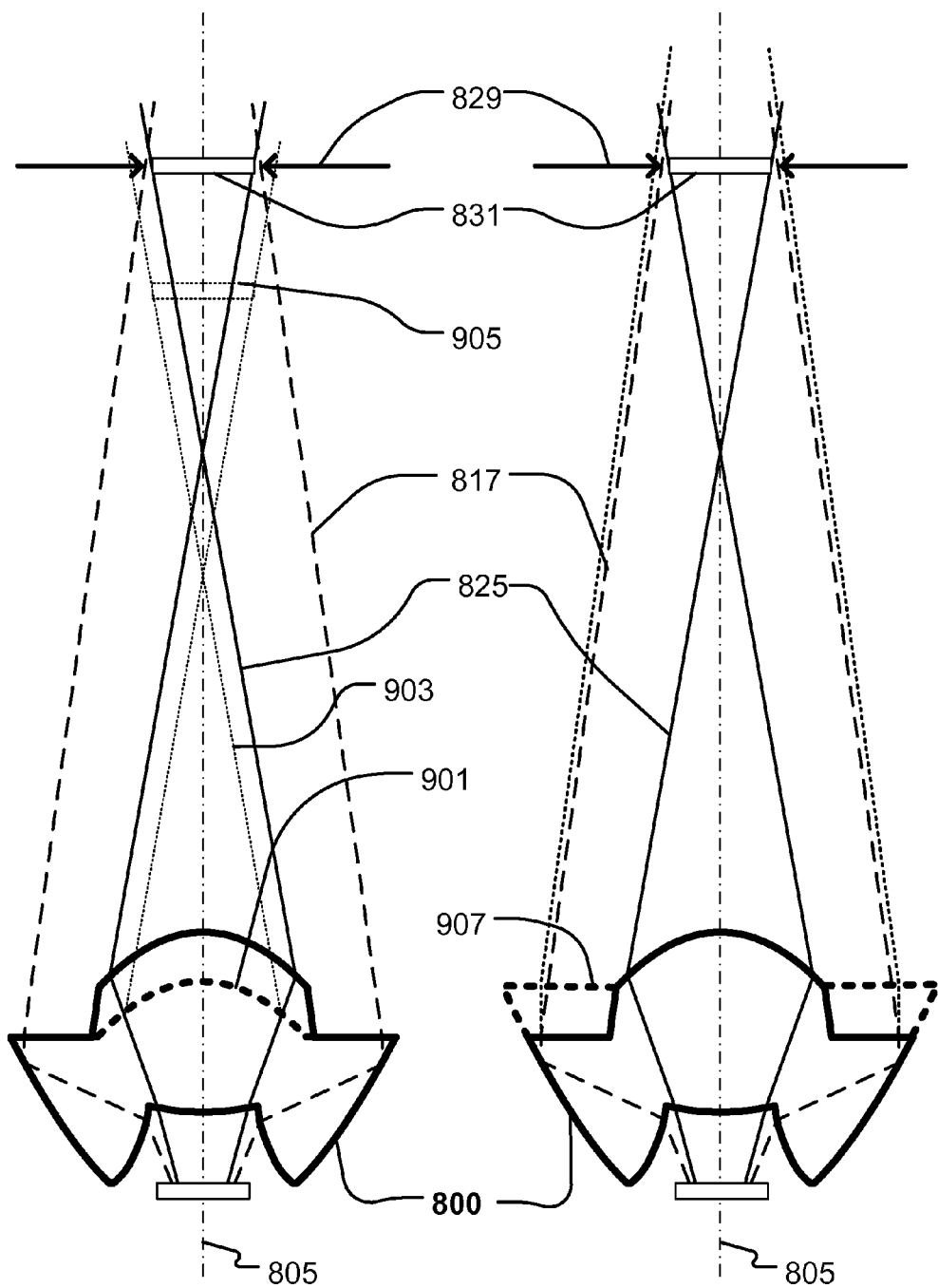
FIGS. 9a-9e compare the performance of the light collector according to the present invention with light collectors according to prior art.
Figure 9C:
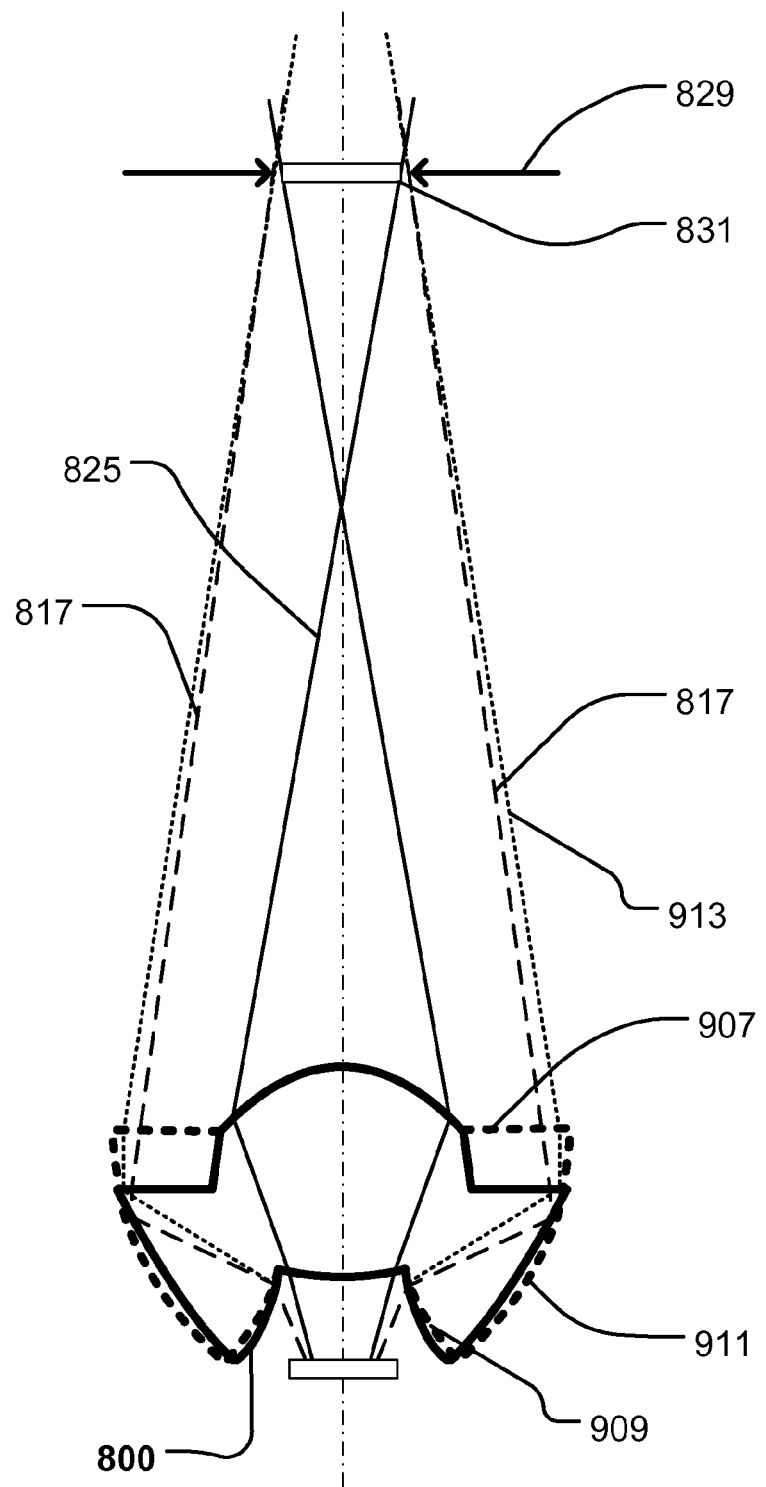

FIG. 9a-9c compare the light collector according to the present invention with light collectors according to prior art and illustrate the basic principles of a situation where the light from the light source is coupled through an aperture.

The light collector 800 according to the present invention is in FIG. 9a-9d illustrated in solid lines, and the part of a prior art light collector which differs from the light collector 800 is illustrated in dotted lines 901. The principles of the light collector 800 according the present invention are described in FIG. 8, and the first light beam part 825 is in the illustrated situation adapted to provide an image of the light source at the aperture 829 which matches the size of the aperture. The second light beam part 817 is also adapted to match the size of the aperture. Most of the light collected by the light collector propagates thus along optical axis 805 and is thus coupled through the aperture 829.

FIG. 9a illustrates the first light beam part 903 (in dotted line) of a central part of a light collector 901 according to prior art having the same cross section dimensions as the light collector 800 according to the present invention. It can be seen that the first light beam part 903 from the prior art light collector is larger than the size of the aperture at the aperture plane, and this light is thus lost. The image of the light source created 905 by the prior art light collector 901 is pulled away from the aperture.

FIG. 9b illustrates a situation where the central part of the prior art light collector has the same optical characteristics as the central part of the light collector according to the present invention. The peripheral part 907 of prior light collector is in this situation larger in both height and cross section. It is thus possible to position a larger number of light sources and light collectors in a given area when using the light collector 800 according to the present invention. This is useful when light from multiple light sources needs to be coupled through an aperture and projected by a projecting system, as more light can be held within the limit of the acceptance angle and cross section of the projecting system. The second light beam 909 (in dotted lines) created by the peripheral part of the prior art light collector will be increased at the aperture, resulting in loss of light.

FIG. 9c illustrates a situation where the central part of the prior art light collector has the same optical characteristics as the central part of the light collector according to the present invention. The prior light collector is in this situation adapted to have the same cross section as the cross section of the light collector according to the present invention. The entrance surface 909 and reflection surface 911 of the peripheral part 907 is as a consequence change in order to direct the peripheral part of the emitted light towards the aperture 829. The peripheral part 907 of the prior art light collector is in the illustrated figure adapted to concentrated the light 913 such that the light passes through the aperture 829. The divergence angle of the outermost light beam 913 from the peripheral part 907 in relation to the optical axes is increased compared to the divergence angle of the outermost light beam 817 from the peripheral part of the light collector according to the present invention.

It is thus possible to position a larger number of light sources and light collectors in a given area when using the light collector 800 according to the present invention. This is useful when light from a multiple numbers of light sources need to be coupled through an aperture and projected by a projecting system, as more light can be held with in the limit of the acceptance angle and cross section of the projecting system. The second light beam 909 (in dotted lines) created by the peripheral part of the prior art light collector will be increased at the aperture, resulting in loss of light.

Figures 9D, 9E:
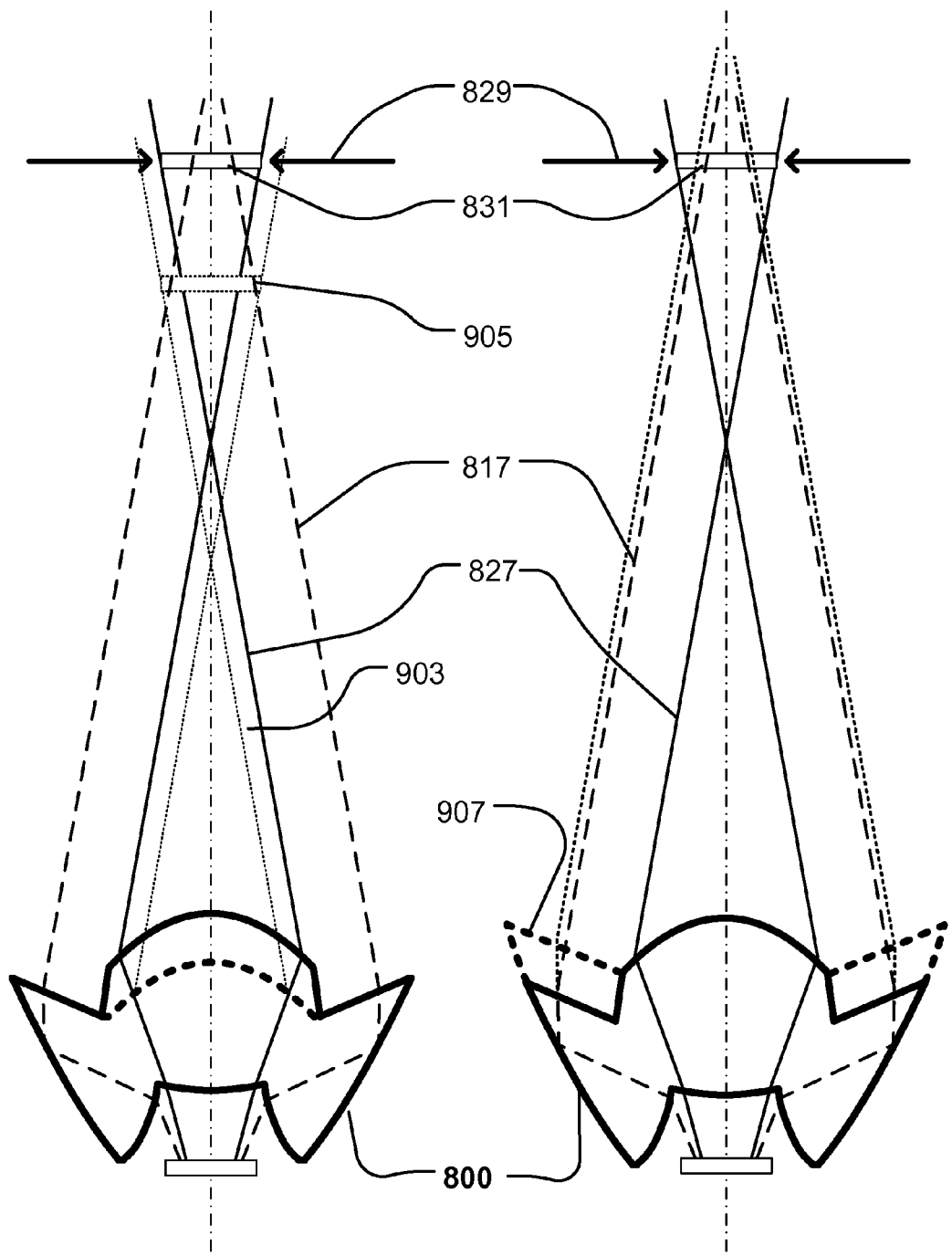

FIGS. 9d and 9e correspond to FIGS. 9a and 9b, respectively, with the difference that the exit surface of the peripheral lens part has been angled in order to focus the second light beam part further.

Figure 10A:
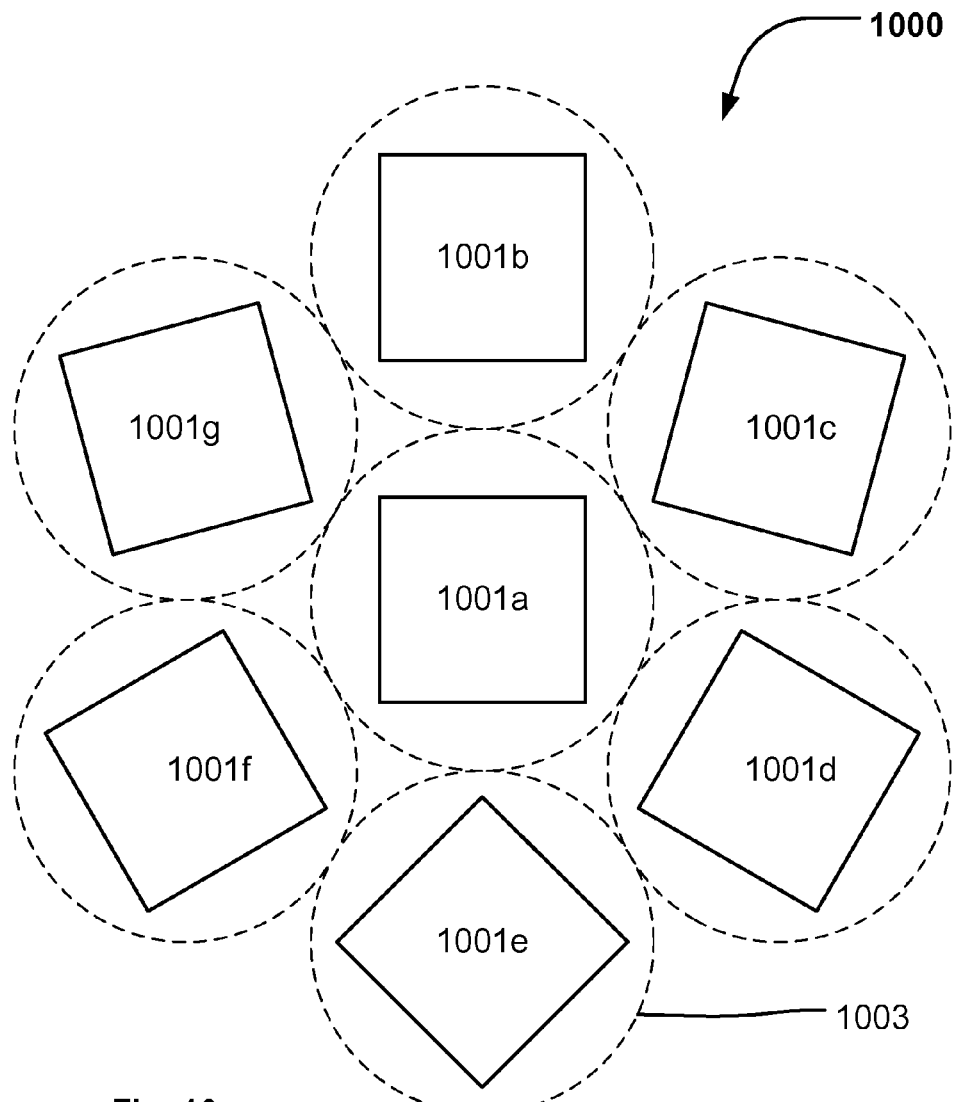
FIGS. 10a and 10b illustrate a set up of the light sources in an illumination device.
Figure 10B:
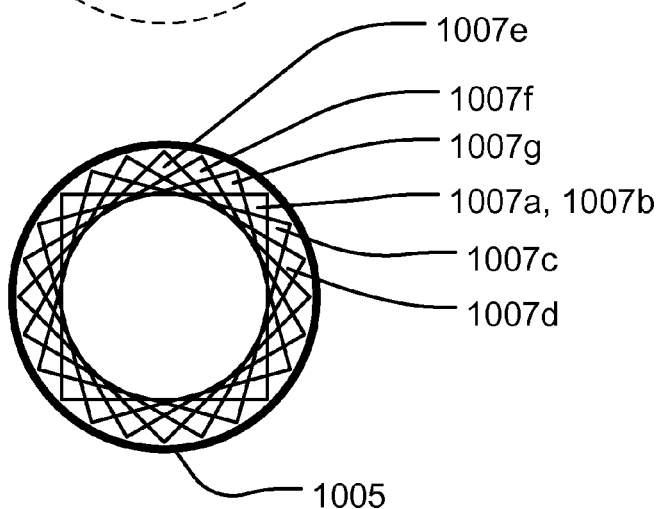

FIG. 10 illustrates a simplified front view of a possible set up of the light sources at the light source module of the illumination devices illustrated in FIGS. 2a, 2b, 5a and 5b. The light sources 1001a-1001g are set up in a circular array 1000 with one center light source 1001a positioned at the primary optical axis, and six off-axis light sources 1001b-1001g are positioned around the central light source 1001a. The light collecting means associated with each light source are adapted to create an image of the light source in proximity to an aperture as described above. The edge of the light collecting means is illustrated in broken lines 1003. The light sources are illustrated as quadratic LEDs emitting white light, but the person skilled in the art will realize that the light sources can have any shape and be any kind of light sources. The light sources are further rotated in relation to each other and in relation to the primary optical axes as illustrated. FIG. 10*b* illustrates a view through the aperture 1005 where the images of each light source are created by the light collection means. Each light source has at least one non overlapping part 1007*a*-1007*g* which does not overlap with the image of at least one of the other light sources. The consequence is that the light from the light sources can be substantially equally distributed through the aperture whereby a more uniform illumination of the aperture it created.

FIG. 11 illustrates a simplified front view of a possible set up of light sources illustrated in FIG. 10 where the light sources are quadratic LEDs emitting light having different colors, where light sources 1101*b* and 1101*e* emit green light, 1101*c* and 1101*f* emit red light, 1101*d* and 1101*g* emit white light and 1101*a* emits blue light. The light source pairs having the same color have been rotated 45 degrees in relation to each other resulting in a more uniform light distribution at the aperture 1005. FIG. 11*b* illustrates a view through the aperture 1005 where the images of each light source are created by the light collection means. Each light source has at least one non overlapping part which does not overlap with the image of at least one of the other light sources as described above.

FIG. 11*c*-11*f* illustrate the view through the aperture shown in FIG. 11*b* where only the images of one color are illustrated in each figure. FIG. 11*c* illustrates the red light sources, FIG. 11*d* illustrates the white light sources, FIG. 11*e* illustrates the green light sources and FIG. 11*f* illustrates the blue light source. Advantageously special lens lenses can be designed for each light source, for instance the blue light source 1101*a* to fill the aperture. Further, it could be an advantage if the star pattern from the different colors are aligned to each other so the intensity distribution is identical for all colors including angular alignment.

FIG. 11*c*-11*e* illustrate that the image of each light source in a color pair has at least a non overlapping part which does not overlap with the image of at least one light source having the same color. The red light sources 1101*c* and 1001*f* thus have non overlapping image parts 1003*c* and 1001*f*, respectively, the white light sources 1101*g* and 1001*d* thus have non overlapping image parts 1003*g* and 1003*d*, respectively, and the green light sources 1101*b* and 1001*e* thus have non overlapping image parts 1003*b* and 1003*e*, respectively. The different colors are as a result distributed more uniformly in the aperture.

FIG. 11*f* illustrates the image of the blue light source 1103*a* at the aperture. This illustrated set up comprises only one blue light source due to the fact that the blue LEDs are often more efficient than LEDs of other colors, and less blue light is required to generate white light. However, it is to be understood that any number of light source and any number of the different colors can be used. It is possible to perform color mixing by controlling the intensity of the colors as known in the art.

In another embodiment there could be three green light sources and three red light sources around the central blue light source. The three sources of the same color should then be rotated 30 degrees with respect to each other.

FIG. 12 illustrates a simplified front view of another possible set up of the light sources illustrated in FIG. 10. The light sources 1201*a*-1201*g* are in this embodiment LEDs having at least two emitters emitting light beams having different colors. The illustrated LEDs each have a red emitter 1202*r*, a green emitter 1202*g*, a blue emitter 1202*b* and a white emitter 1202*w*. The light sources 1201*a*-1201*b* are rotated in relation to each other and the primary optical axis in a similar way as the light sources shown in FIG. 10.

FIG. 12*b* illustrates a view through the aperture 1005 where the images of each light source are created by the light collecting means. Each light source has, as the light sources in FIG. 10, at least one non overlapping part 1207*a*-1207*g* which does not overlap with the image of at least one of the other light sources. The consequence is that the light from the light sources can be substantially equally distributed through the aperture whereby a more uniform illumination of the aperture it created.

The light sources have further been arranged such that at least a part of the light beam emitted by at least one emitter of one of the light sources overlaps at least a part of another light beam emitted by an emitter having a different color than another one of the light sources. The light sources are also arranged such that at least a part of the light beam emitted by at least one emitter of one of the light sources has at least a non overlapping part which does not overlap with the light beam emitted by an emitter having substantially the same color as another one of the light sources. This makes it possible to provide a uniform illumination of the aperture and at the same time perform color mixing as the different colors are adapted to substantially fill the aperture.

FIG. 12*b* illustrates a view through the aperture 1005 where the images of each light source are created by the light collection means. Each light source has at least one non overlapping part which does not overlap with the image of at least one of the other light sources as described above. The different colors are merged in the aperture such that most of the aperture is illuminated by red, greed, blue and white light.

FIG. 12*c*-12*f* illustrate that the image of each emitter of the light sources at the aperture has at least a non overlapping part which does not overlap with the image of at least an emitter of another light source having the same color. The colors of light source 1201*b* and FIG. 12*c* illustrate that the red emitter 1202*r* of light source 1201*b* and the red emitter 1202*r* of light source 1201*g* for instance have non overlapping image parts 1203*b*-*r* and 1203*g*-*r*. FIG. 12*d* illustrates that the white emitter 1202*w* of light source 1201*b* and the white emitter 1202*w* of light source 1201*g* have non overlapping image parts 1203*b*-*w* and 1203*g*-*w*. FIG. 12*e* illustrates that the green emitter 1202*g* of light source 1201*b* and the green emitter 1202*g* of light source 1201*g* have non overlapping image parts 1203*b*-*g* and 1203*g*-*g*. FIG. 12*f* illustrates that the blue emitter 1202*b* of light source 1201*b* and the green emitter 1202*b* of light source 1201*g* have non overlapping image parts 1203*b*-*b* and 1203*g*-*b*. It is to be understood that the non labeled light emitters in a similar way also have a non overlapping part. The skilled person will realize, even though the image of the light sources in FIG. 10-12 are illustrated a being positioned proximately to the aperture, in connection with a projecting system such as the one illustrated in FIG. 1-5 can be positioned at position approximately between said aperture and the entrance pupil of the projecting system.

The embodiments have been described in view of the case where an image of the light source is created in proximity to the aperture; however, the skilled person will understand that it is possible to carry out the present invention with regard to overlapping and non overlapping light beam parts in a similar way. The skilled person will further realize that the width of a light beam or optical image does not have completely sharp edges and that the width can be obtained in many different ways for instance as defined by commonly used methods such as, D4σ, 10/90 or 20/80 knife-edge, 1/e2, FWHM and D86.

The present invention can for instance be implemented into a projecting device comprising a digital imaging device such as a DML, DLP, LCD, LCOS or into the head of a moving head light fixture comprising a base, a rotatable yoke connected to the base and a rotatable head connected to the yoke. Hereby a power efficient digital projecting device or a moving head with uniform illumination of the imaging gate and without color artifacts is provided.

The invention claimed is:

1. A method for designing an illumination device to illuminate an optical gate and to project an image of the optical gate toward a target surface, where the illumination device comprises:
   a light source module comprising a number of light sources and a number of collectors, where said collectors each include:
      a central lens comprising a central entrance surface and a central exit surface; and
      a peripheral lens comprising a peripheral entrance surface, a peripheral exit surface, and a peripheral reflective surface;
   a projecting system positioned along a primary optical axis of the illumination device, said projecting system having an entrance pupil adapted to collect at least part of said light generated by said light sources and to project said collected light toward a target surface; and
   an aperture positioned between said light source module and said entrance pupil of said projecting system;
where the method comprises the steps of:
   aligning said central lens along a source optical axis of said respective light source;
   aligning said peripheral lens to at least partially surround said central lens;
   positioning said collectors to collect and convert light from at least one of said light sources into a source light beam that propagates at least partially along a primary optical axis;
   positioning said central lens to collect and convert a first part of said light from a respective light source and to image said first part of said light at a position between said aperture and said entrance pupil;
   positioning said peripheral lens to collect and convert a second part of said light from said respective light source and to concentrate said second part of said light at a position approximately between said aperture and said entrance pupil; and
   positioning said projecting system to collect light passing through said aperture and to project said light passing through said aperture toward a target surface.

2. The method of claim 1, wherein to image said first part of said light at a position between said aperture and said entrance pupil is defined as to image said first part of said light in a position starting for a small distance in front of said aperture and ending at a small distance after said entrance pupil, wherein said small distance in front of said aperture does not exceed a cross section of said aperture and said small distance after said entrance pupil does not exceed a cross section of said entrance pupil.

3. The method of claim 1, wherein said image of said first part of said light is positioned proximate to said aperture.

4. The method of claim 3, wherein positioned proximate to said aperture is defined as not exceeding a distance in front of said aperture larger than a cross section of said aperture and a distance after said aperture larger than a diameter of said aperture.

5. The method of claim 1, wherein said image of said first part of said light is positioned proximate to said entrance pupil.

6. The method of claim 5, wherein positioned proximate to said entrance pupil is defined as not exceeding a distance in front of said entrance pupil larger than a cross section of said aperture and a distance after said entrance pupil larger than a diameter of said aperture.

7. The method of claim 1, wherein said second part of said light is concentrated proximate to said aperture while said image of said first part of said light is positioned proximate to said entrance pupil.

8. The method of claim 1, wherein said second part of said light is concentrated proximate to said entrance pupil.

9. The method of claim 1, wherein a divergence angle relative to said source optical axis of said first part of said light collected and converted by said central lens is smaller than an acceptance angle of said projecting system where said acceptance angle is defined by the resulting focal length of said projecting system and the resulting acceptance area of said projecting system; and said first part of said light collected and converted by said central lens hits said entrance pupil within said resulting acceptance area of said projecting system.

10. The method of claim 1, wherein a divergence angle relative to said source optical axis of said second part of said light collected and converted by said peripheral lens is smaller than an acceptance angle of said projecting system where said acceptance angle is defined by the resulting focal length of said projecting system and the resulting acceptance area of said projecting system; and said second part of said light collected and converted by said peripheral lens hits said entrance pupil within said resulting acceptance area of said projecting system.

11. The method of claim 1, wherein at least one of said light sources is positioned at a source height offset relative to said primary optical axis and angled relative to said primary optical axis.

12. The method of claim 1, wherein said number of light sources are arranged such that said source optical axis of each light source meet in a common area along said primary optical axis, between said aperture and said entrance pupil.

13. The method of claim 12, wherein said common area is an area near said primary optical axis where at least one source optical axis intersects a plane through said primary optical axis, and where at least one source optical axis intersects a plane through at least another source optical axis.

14. The method of claim 1, wherein said image of said first part of said light positioned proximate said aperture is smaller than said aperture.

15. The method of claim 1, wherein at least part of said second part of said light is offset relative to said image of said first part of said light at said aperture plane.

16. The method of claim 1, wherein said central lens further comprises an extension part positioned between said central entrance surface and said central exit surface, where said extension part protrudes from said peripheral exit surface and elevates said central exit surface a distance above said peripheral exit surface.

17. The method of claim 1, further comprising the step of positioning a digital imaging device at said aperture to project an image generated by said digital imaging device toward said target surface, wherein said aperture is defining an object plane and is limiting an object diameter.

18. The method of claim 17, wherein the illumination device is housed within a head of a moving head light fixture, the moving head light fixture further comprising a base, a yoke rotatably connected to said base, and said head rotatably connected to said yoke, wherein said digital imaging device is at least one GOBO device.

19. The method of claim 1, wherein the second part of said light, collected and converted from said peripheral lens, enters said peripheral lens through said entrance surface, is reflected by said reflection surface, and exits said peripheral lens through said exit surface, wherein said first part of said light and said second part of said light have different divergence angles and intensity distributions in said aperture.

20. A method for designing an illumination device to illuminate an optical gate and to project an image of the optical gate toward a target surface, where the illumination device comprises:
- a light source module comprising a number of light sources and a number of collectors, where said collectors each include:
  - a central lens comprising a central entrance surface and a central exit surface; and
  - a peripheral lens comprising a peripheral entrance surface, a peripheral exit surface, and a peripheral reflective surface;
- a projecting system positioned along a primary optical axis of the illumination device, said projecting system having an entrance pupil adapted to collect at least part of said light generated by said light sources and to project said collected light toward a target surface; and
- an aperture positioned between said light source module and said entrance pupil of said projecting system;

where the method comprises the steps of:
- positioning at least one of said light sources at a source height offset relative to said primary optical axis and angled relative to said primary optical axis;
- aligning said central lens along a source optical axis of said respective light source;
- aligning said peripheral lens to at least partially surround said central lens;
- positioning said collectors to collect and convert light from at least one of said light sources into a source light beam that propagates at least partially along said primary optical axis;
- positioning said central lens to collect and convert a first part of said light from a respective light source and to image said first part of said light at a position between said aperture and said entrance pupil;
- positioning said peripheral lens to collect and convert a second part of said light from said respective light source and to concentrate said second part of said light at a position between said aperture and said entrance pupil, wherein said second part of said light enters said peripheral lens through said entrance surface, is reflected by said reflection surface, and exits said peripheral lens through said exit surface;
- arranging said number of light sources such that said source optical axis of each light source meet in a common area along said primary optical axis, between said aperture and said entrance pupil, where said first part of said light and said second part of said light have different divergence angles and intensity distributions in said aperture; and
- positioning said projecting system to collect light passing through said aperture and to project said light passing through said aperture toward a target surface.

* * * * *